(12) United States Patent
Gupta

(10) Patent No.: US 11,907,378 B2
(45) Date of Patent: Feb. 20, 2024

(54) AUTOMATED APPLICATION VULNERABILITY AND RISK ASSESSMENT

(71) Applicant: Virsec Systems, Inc., San Jose, CA (US)

(72) Inventor: Satya V. Gupta, Dublin, CA (US)

(73) Assignee: Virsec Systems, Inc., San Jose, CA (US)

( * ) Notice: Subject to any disclaimer, the term of this patent is extended or adjusted under 35 U.S.C. 154(b) by 280 days.

(21) Appl. No.: 17/460,004

(22) Filed: Aug. 27, 2021

(65) Prior Publication Data

US 2022/0067174 A1 Mar. 3, 2022

Related U.S. Application Data

(60) Provisional application No. 63/071,113, filed on Aug. 27, 2020, provisional application No. 63/155,466, (Continued)

(30) Foreign Application Priority Data

Jan. 18, 2021 (IN) .............................. 202141002185
Jan. 18, 2021 (IN) .............................. 202141002208

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC ............. G06F 21/577; G06F 2221/033; G06F 2221/034; G06F 21/562; G06F 21/566
See application file for complete search history.

(56) References Cited

U.S. PATENT DOCUMENTS 8,347,267 B2 1/2013 Givoni et al.
9,246,935 B2 1/2016 Lietz et al.
(Continued)

FOREIGN PATENT DOCUMENTS

WO WO-2015007166 A1 * 1/2015 .......... G06F 21/563
WO 2016/130372 A1 8/2016
(Continued)

OTHER PUBLICATIONS

Xia, M. et al: "Effective Real-Time Android Application Auditing", 2015 IEEE Symposium on Security and Privacy, IEEE, May 17, 2015 (May 17, 2015), pp. 899-914.
(Continued)

*Primary Examiner* — Meng Li
(74) *Attorney, Agent, or Firm* — Hamilton, Brook, Smith & Reynolds, P.C.

(57) ABSTRACT

Embodiments assess security vulnerability of an application. An embodiment runs one or more static and dynamic analysis tools on the application to generate a static vulnerability report and a dynamic vulnerability report. In turn, code of the application is decompiled to identify code of the application that accepts user input. One or more vulnerabilities of the application are determined using the identified code of the application that accepts user input and a vulnerability report is generated that indicates the one or more vulnerabilities of the application determined using the identified code of the application that accepts user input. A final static vulnerability report and a final dynamic vulnerability report are generated based on the static and dynamic vulnerability reports and the generated vulnerability report indicating the one or more vulnerabilities of the application determined using the identified code of the application that accepts user input.

20 Claims, 13 Drawing Sheets

Related U.S. Application Data filed on Mar. 2, 2021, provisional application No. 63/155,464, filed on Mar. 2, 2021, provisional application No. 63/133,173, filed on Dec. 31, 2020, provisional application No. 63/190,099, filed on May 18, 2021.

(56) References Cited

U.S. PATENT DOCUMENTS

| | | | |
|---|---|---|---|
| 9,418,230 | B2 | 8/2016 | Archer et al. |
| 9,501,650 | B2 | 11/2016 | Chess et al. |
| 9,589,560 | B1 | 3/2017 | Vitaladevuni et al. |
| 10,116,681 | B2 | 10/2018 | Cornell et al. |
| 10,354,074 | B2 | 7/2019 | Gupta |
| 10,387,659 | B1 | 8/2019 | Youngberg et al. |
| 10,395,041 | B1 | 8/2019 | Youngberg et al. |
| 10,447,730 | B2 | 10/2019 | Gupta |
| 10,467,419 | B1* | 11/2019 | Youngberg ........... G06F 21/566 |
| 2004/0046785 | A1 | 3/2004 | Keller |
| 2013/0111595 | A1 | 5/2013 | Amit et al. |
| 2014/0082735 | A1 | 3/2014 | Beskrovny et al. |
| 2014/0082739 | A1 | 3/2014 | Chess et al. |
| 2015/0215332 | A1 | 7/2015 | Curcic et al. |
| 2015/0261653 | A1 | 9/2015 | Lachambre et al. |
| 2015/0309813 | A1 | 10/2015 | Patel |
| 2016/0164891 | A1 | 6/2016 | Satish et al. |
| 2017/0270303 | A1 | 9/2017 | Roichman et al. |
| 2017/0288878 | A1 | 10/2017 | Lee et al. |
| 2019/0138725 | A1 | 5/2019 | Gupta |
| 2019/0286833 | A1 | 9/2019 | Takumi et al. |
| 2020/0004963 | A1* | 1/2020 | Zheng ................... G06F 21/562 |
| 2020/0042714 | A1 | 2/2020 | Gupta |
| 2020/0097662 | A1* | 3/2020 | Hufsmith ............. H04L 9/0643 |
| 2020/0134193 | A1 | 4/2020 | Youngberg et al. |
| 2020/0134194 | A1 | 4/2020 | Youngberg et al. |
| 2020/0134195 | A1 | 4/2020 | Youngberg et al. |
| 2020/0336507 | A1 | 10/2020 | Lee et al. |
| 2021/0099483 | A1* | 4/2021 | Shukla .................. G06F 21/566 |
| 2021/0160273 | A1* | 5/2021 | Choi ................... H04L 63/1433 |
| 2022/0198025 | A1 | 6/2022 | Gupta et al. |
| 2022/0207151 | A1 | 6/2022 | Gupta |
| 2022/0210180 | A1 | 6/2022 | Gupta |
| 2022/0214928 | A1 | 7/2022 | Gupta et al. |
| 2022/0391506 | A1 | 12/2022 | Gupta |
| 2023/0004652 | A1 | 1/2023 | Gupta |

FOREIGN PATENT DOCUMENTS

| | | |
|---|---|---|
| WO | 2020/026228 A1 | 2/2020 |
| WO | 2022/047245 A1 | 3/2022 |
| WO | 2022/147474 A1 | 7/2022 |
| WO | 2022/147478 A1 | 7/2022 |
| WO | 2022/155685 A1 | 7/2022 |
| WO | 2022/155687 A1 | 7/2022 |
| WO | 2022/246436 A1 | 11/2022 |
| WO | 2022/246437 A1 | 11/2022 |

OTHER PUBLICATIONS

Caputo, D., et al: "Droids in Disarray: Detecting Frame Confusion in Hybrid Android Apps", Jun. 11, 2019 (Jun. 11, 2019), Advances in Databases and Information Systems; [Lecture Notes in Computer Science; Lect.Notes Computer], Springer International Publishing, Cham, pp. 121-139.
Chen, Lu., et al, "Research on Mobile Application Local Denial of Service Vulnerability Detection Technology Based on Rule Matching", 2019 IEEE International Conference on Energy Internet (ICEI), IEEE, May 27, 2019 (May 27, 2019), pp. 585-590.
International Search Report and Written Opinion for PCT/US2021/048077 dated Dec. 20, 2021 titled "Automated Application Vulnerability And Risk Assessment".
"ATT&CK (Registered)", The Mitre, Available online at: <https://attack.mitre.org>, Sep. 14, 2023, 1 page.
"CAPEC—Common Attack Pattern Enumeration and Classification", (CAPEC(Trademark)), Available on https://capec.mitre.org, Jan. 2, 2022, 2 pages.
"CAPEC View: Mechanisms of Attack", View ID: 1000, (Version 3.6), Available online https://capec.mitre.org/data/definitions/1000.html, Jan. 2, 2022, 2 pages.
"Configuration Management Database (CMDB)", 2023, 15 pages.
"CWE View: Software Development" View ID: 699, Individual Dictionary Definition (4.6), Available on https://cwe.mitre.org/data/definitions/699.html, Jan. 2, 2022, 2 pages.
"Integrated Risk Management (IRM)", Gartner Glossary, Available on https://www.gartner.com/en/information-technology/glossary/integrated-risk-management-irm, Jan. 2, 2022, 5 pages.
"javap—The Java Class File Disassembler", Oracle, Java SE Documentation, Available on https://docs.oracle.com/javase/7/docs/technotes/tools/windows/javap.html, Jan. 2, 2022, 3 pages.
"The Shadow Brokers", Wikipedia, Available on https://en.wikipedia.org/wiki/The_Shadow_Brokers, Jan. 2, 2022, 8 pages.
"Welcome to YARA's documentation-yara 4.3.2 documentation" Available online at: <https://yara.readthedocs.io/en/stable/>, retrieved on Sep. 14, 2023, 4 pages.
"Windows Print Spooler Remote Code Execution Vulnerability", Security Vulnerability, CVE-2021-34527, Available on https://msrc.microsoft.com/update-guide/vulnerability/CVE-2021-34527#title, Jun. 13, 2023, 1 page.
Chen et al., "Automated system change discovery and management in the cloud", IBM Journal of Research and Development, vol. 60, No. 2-3, Mar. 1, 2016, pp. 2:1-2:10.
Chen et al., "Detecting and Identifying System Changes in the Cloud via Discovery by Example", 2014 IEEE International Conference on Big Data, Oct. 27, 2014, pp. 90-99.
David Stahl, "What's an RFC and what can they do for me?", Global Knowledge, Available on https://www.globalknowledge.com/us-en/resources/resource-library/articles/whats-an-rfc-and-what-can-they-do-for-me/, Sep. 16, 2009, 2 pages.
Dizdar, A. , "Why are SAST solutions not always the best option for AST?", Bright, Jan. 22, 2020, 10 pages.
Horvath, M., et al., "Magic Quadrant for Application Security Testing" Gartner Reprint, (33 pages) Apr. 29, 2020, 33 pages, retrieved from https://www.gartner.com/doc/reprints?id=1-1YWZKUB5&ct=200429&st=sb.
International Search Report and Written Opinion received for PCT Patent Application No. PCT/US2021/073197, dated Mar. 21, 2022, 10 pages.
International Search Report and Written Opinion received for PCT Patent Application No. PCT/US2021/073201, dated Apr. 7, 2022, 10 pages.
International Search Report and Written Opinion received for PCT Patent Application No. PCT/US2022/070236, dated Apr. 8, 2022, 15 pages.
International Search Report and Written Opinion received for PCT Patent Application No. PCT/US2022/070240, dated Apr. 7, 2022, 17 pages.
International Search Report and Written Opinion received for PCT Patent Application No. PCT/US2022/072416, dated Sep. 8, 2022, 13 pages.
International Search Report and Written Opinion received for PCT Patent Application No. PCT/US2022/072417, dated Sep. 8, 2022, 15 pages.
Johns, M., et al., "XSSDS: Server-Side Detection of Cross-Site Scripting Attacks", Computer Security Applications Conference, 2008. Acsac, Dec. 8, 2008, pp. 335-344.
Koutroumpouchos, K., et al., "ObjectMap: detecting insecure object deserialization", PCI '19: Proceedings of the 23rd Pan-Hellenic Conference on Informatics, Nov. 28, 2019, pp. 67-72.
Potdar, S., "The Curious Case of False Positives in Application Security", Security Zone, May 13, 2019, 4 pages.
Prevelakis et al., "Sandboxing Applications", USENIX, The Advanced Computing Systems Association, Feb. 25, 2019, pp. 1-9.
QwietAI "ShiftLeft Achieves Highest Ever SAST Score on OWASP Benchmark", Nov. 1, 2023, 7 pages, retrieved from https://qwiet.ai/news-press/shiftleft-achieves-highest-ever-sast-score-on-owasp-benchmark/.

(56) References Cited

OTHER PUBLICATIONS

Secure execution of privileged scripts ED-Darl Kuhn, IP.COM, IP.COM Inc., West Henrietta, Sep. 18, 2009, XP013134389.
Sun, F., et al., "Client-Side Detection of XSS Worms by Monitoring Payload Propagation", Advances In Databases And Information Systems, Sep. 21, 2009, pp. 539-554.

* cited by examiner

FIG. 8

AUTOMATED APPLICATION VULNERABILITY AND RISK ASSESSMENT

RELATED APPLICATIONS

This application claims the benefit of U.S. Provisional Application No. 63/071,113, filed on Aug. 27, 2020; U.S. Provisional Application No. 63/133,173, filed on Dec. 31, 2020; U.S. Provisional Application No. 63/155,466, filed on Mar. 2, 2021; U.S. Provisional Application No. 63/155,464, filed on Mar. 2, 2021; and U.S. Provisional Application No. 63/190,099, filed on May 18, 2021.

This application claims priority under 35 U.S.C. § 119 or 365 to Indian Provisional Application No. 202141002208, filed on Jan. 18, 2021 and Indian Provisional Patent Application No. 202141002185, filed on Jan. 18, 2021.

The entire teachings of the above applications are incorporated herein by reference in their entirety.

BACKGROUND

With each passing day, cyber-attacks are becoming increasingly sophisticated. Attacks are often targeted to exploit specific vulnerabilities in specific applications. Various methods and tools exist for identifying these vulnerabilities in applications, but these existing methods and tools are inadequate.

SUMMARY

Embodiments provide methods and systems to assess security vulnerability of applications.

An example embodiment is directed to a method that first runs one or more static analysis tools on an application to generate a static vulnerability report and, likewise, runs one or more dynamic analysis tools on the application to generate a dynamic vulnerability report. To continue, the method decompiles code of the application to identify code of the application that accepts user input. In turn, one or more vulnerabilities of the application are determined using the identified code of the application that accepts user input and a vulnerability report indicating the one or more vulnerabilities of the application determined using the identified code of the application that accepts user input is generated. Then, a final static vulnerability report and a final dynamic vulnerability report are generated. The final reports are generated based on (i) the static vulnerability report, (ii) the dynamic vulnerability report, and (iii) the generated vulnerability report that indicates the one or more vulnerabilities of the application determined using the identified code of the application that accepts user input. The final static vulnerability report and the final dynamic vulnerability report enable remediating vulnerabilities of the application.

In an embodiment, the static and dynamic analysis tools are existing vulnerability analysis tools that are configured to generate the aforementioned static vulnerability report and dynamic vulnerability report. Moreover, in embodiments, the static analysis tools and the dynamic analysis tools may be any such tools known in the art. According to an embodiment, the one or more static analysis tools are at least one of: a source component analysis (SCA) tool and a software application security test (SAST) tool. Moreover, in an embodiment, the one or more dynamic analysis tools are at least one of: a dynamic application security test (DAST) tool and an interactive application security test (IAST) tool.

According to an embodiment, decompiling the code of the application includes decompiling Java pages of the application. In yet another embodiment, decompiling the code of the application comprises recursively decompiling the code to identify code of the application that accepts user input. The code of the application identified as accepting user input may be any such code as is known in the art. For instance, in an embodiment, the identified code of the application that accepts user input is at least one of: a Uniform Resource Locator (URL) and an application programming interface (API).

Another embodiment of the method determines, based on the decompiled code, input formatting accepted by the identified code of the application that accepts user input. Such an embodiment may determine the one or more vulnerabilities of the application using the determined input formatting.

According to an example embodiment, generating the final static vulnerability report and the final dynamic vulnerability report comprises removing at least one of duplicate vulnerabilities and false positive vulnerabilities from the static vulnerability report and the dynamic vulnerability report, i.e., the originally determined static and dynamic reports. An example embodiment removes the false positives and the duplicate vulnerabilities based on the generated vulnerability report that indicates the one or more vulnerabilities of the application determined using the identified code of the application that accepts user input. In an embodiment, the duplicate vulnerabilities and false positive vulnerabilities are removed from the static vulnerability report and the dynamic vulnerability report by first normalizing vulnerability findings in the static vulnerability report and the dynamic vulnerability into standardized vulnerability findings. In turn, the duplicate vulnerabilities and the false positive vulnerabilities are removed by comparing (i) the static vulnerability report and the dynamic vulnerability with the standardized vulnerability findings to (ii) the generated vulnerability report indicating the one or more vulnerabilities of the application determined using the identified code of the application that accepts user input.

An embodiment normalizes the vulnerability findings by first, parsing the vulnerability findings in the static vulnerability report and the dynamic vulnerability to identify keywords in the vulnerability findings. Second, the vulnerability findings in the static vulnerability report and the dynamic vulnerability report are reformatted into the standardized vulnerability findings based on the identified keywords.

Another embodiment is directed to a computer system for assessing security vulnerability of an application. The system includes a processor and a memory with computer code instructions stored thereon that cause the system to assess security vulnerability as described herein.

In an embodiment, the system is configured to (i) run one or more static analysis tools on an application to generate a static vulnerability report and (ii) run one or more dynamic analysis tools on the application to generate a dynamic vulnerability report. The system decompiles code of the application to identify code of the application that accepts user input. In turn, the system (i) determines one or more vulnerabilities of the application using the identified code of the application that accepts user input and (ii) generates a vulnerability report indicating the one or more vulnerabilities of the application determined using the identified code of the application that accepts user input. Then, the system generates a final static vulnerability report and a final dynamic vulnerability report. The system is configured to generate the final reports based on (i) the static vulnerability report, (ii) the dynamic vulnerability report, and (iii) the generated vulnerability report that indicates the one or more vulnerabilities of the application determined using the identified code of the application that accepts user input.

Another embodiment is directed to a computer program product for assessing security vulnerability of an application. The computer program product comprises one or more non-transitory computer-readable storage devices and program instructions stored on at least one of the one or more storage devices. The program instructions, when loaded and executed by a processor, cause an apparatus associated with the processor to assess security vulnerability of an application as described herein.

In an example embodiment, the program instructions cause an apparatus to run one or more static analysis tools on an application to generate a static vulnerability report and run one or more dynamic analysis tools on the application to generate a dynamic vulnerability report. The program instructions cause the apparatus to decompile code of the application to identify code of the application that accepts user input. In turn, the program instructions cause the apparatus to (i) determine one or more vulnerabilities of the application using the identified code of the application that accepts user input and (ii) generate a vulnerability report indicating the one or more vulnerabilities of the application determined using the identified code of the application that accepts user input. Then, the program instructions cause the apparatus to generate a final static vulnerability report and a final dynamic vulnerability report. The apparatus is configured to generate the final reports based on (i) the static vulnerability report, (ii) the dynamic vulnerability report, and (iii) the generated vulnerability report that indicates the one or more vulnerabilities of the application determined using the identified code of the application that accepts user input.

It is noted that embodiments of the method, system, and computer program product may be configured to implement any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 8 depicts an indication of vulnerability remediation forensics that may be determined by embodiments.

DETAILED DESCRIPTION

A description of example embodiments follows. Embodiments provide improved functionality for assessing vulnerability of applications.

A typical modern web facing application is composed of at least three distinct classes of code. The first class of code is foundational code that comes bundled with the operating system (OS). For example, the OS provides libraries to: create processes; allocate and release memory; communicate on network sockets; and read and write configuration files, amongst other tasks. The second class of code is composed of third-party frameworks, executables, and libraries that facilitate functionality required by the application's presentation layer, session layer, authentication, and authorization, amongst others. The third class is code that developers write for implementing the application's core functionality. For example, the developers at an ecommerce company write code that queries databases and displays items a user may wish to buy.

Figure 1:
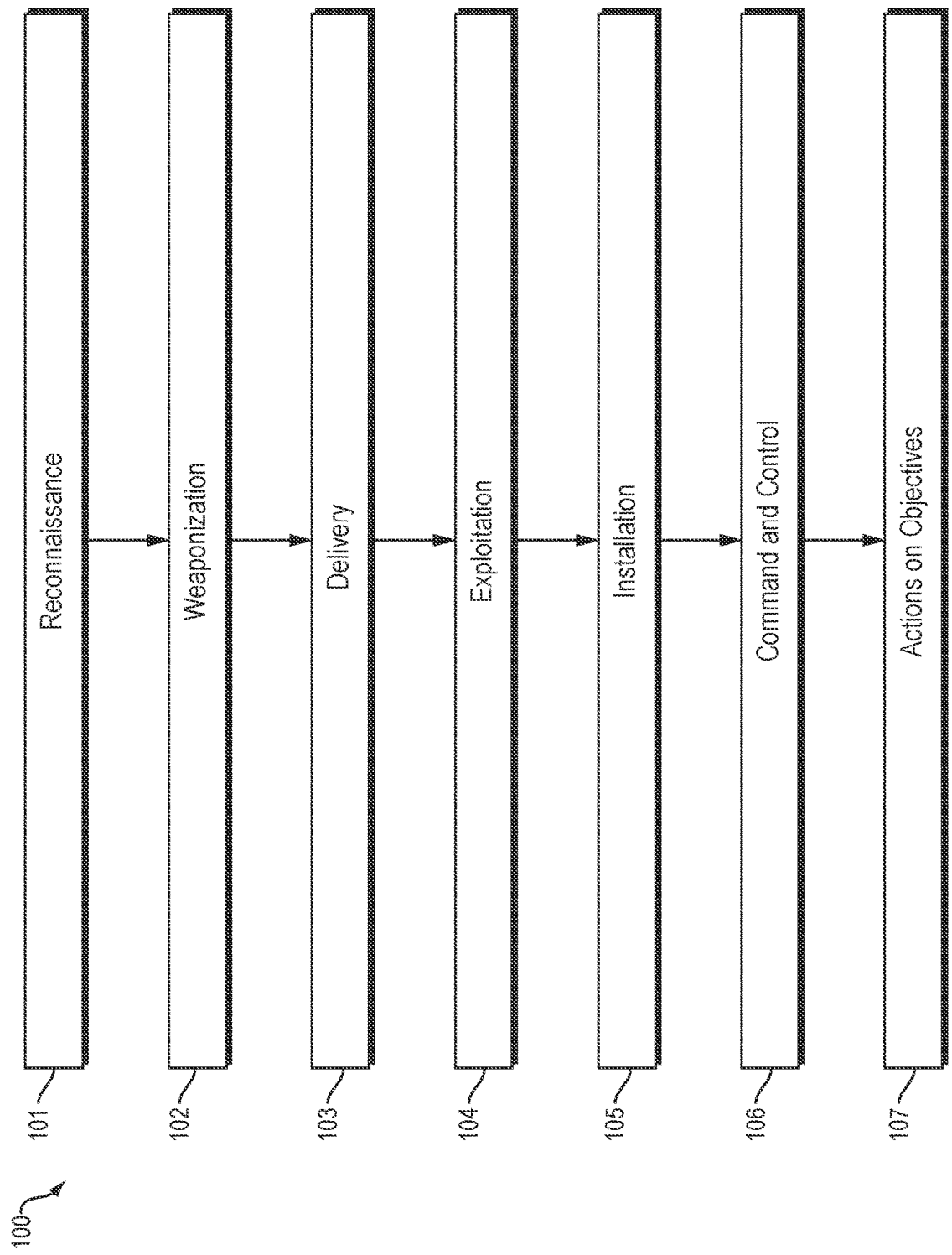
FIG. 1 is a visual depiction of a malicious attack on a computer application that may be prevented by embodiments.

An enterprise hosting such an application must be especially cognizant of vulnerabilities in each class of code since even one vulnerability can open the door into a full-blown attack on an enterprise as indicated in the cyber kill chain 100 illustrated in FIG. 1. The cyber kill chain 100 begins with reconnaissance 101, which, for instance, includes the research, identification, and selection of targets. Next is weaponization 102, where malicious code is paired with a deliverable payload, e.g., a PDF file. In turn, the payload is delivered 103 (e.g., via email) and exploited 104. For exploitation 104, the weapon's code is triggered. At 105, a backdoor is installed on the target's system which provides the bad actor with persistent access. Next, command and control is established 106. This allows the attacker to remotely manipulate the victim's system. In turn, the attacker achieves the objective of the attack 107, e.g., acquisition of data.

As can be seen in the kill chain 100, from the mere delivery 103, a single vulnerability can be utilized to allow an attacker to overtake and control the victim's system. Solutions exist that help identify and fix such vulnerabilities, however, these existing solutions are inadequate.

There are multiple problems that plague these existing vulnerability assessment and mitigation tools. For instance, application security assessment currently relies on multiple incompatible tools. Generally, only a portion of the source code from the three classes of code referred to above is available for analysis. A substantial part of the code is typically in the form of object code that cannot be tested using conventional source code assessment tools. Therefore, a mixture of tools is required to assess vulnerabilities lurking in the code. Results from these disparate tools, such as, Software Application Security Test (SAST), Dynamic Application Security Test (DAST—where source code is not available), Security Posture Management (SPM), Vulnerability Assessment (VA), Application Hardening (AH), and License Verification (LV) tools, amongst others, have to be collated before any meaningful result can be drawn. To make matters worse, one tool, e.g., a SAST tool, may declare some elements of an application, e.g., URLs, as being vulnerable to say, SQL injection, whereas another tool, e.g., a DAST tool, may not indicate such a vulnerability exists. Similarly, the results of one or more vulnerability assessment tools may provide different results because the backend databases of the tools may be sourced from different vendors and synchronized on different dates.

Existing application security tools also generate false positives. Most source and dynamic application security testing tools do not have knowledge or insight into an application's runtime. As a result, the existing tools are limited to monitoring the pre-execution or post-execution context of the application's runtime and deciding whether the application has been attacked or not. As a result, SAST and DAST tools throw, i.e., indicate, too many false positives, and reports generated by these tools cannot be used without extensive manual curation, i.e., manually considering whether indicated vulnerabilities are legitimate.

Application security tools also generate false negatives. Frequently, a typical web application accepts input and, when appropriate input is received, the application provides the next URL. If the appropriate input is not presented by an existing assessment tool, the downstream functionality may not be presented. Additionally, the existing tools, e.g., a DAST/IAST tool, may not even generate "malicious" data for a given URL. In both cases, said vulnerability assessment tool is not able to detect vulnerabilities in the targeted URL or the downstream URL.

Problematically, existing application security tools are not designed for agility. Most developers work in an agile environment. Any "bugs" left over from the previous sprint cycle present a serious context switching problem to developers and a test fixture continuity problem to quality assurance. It is therefore very desirable that the results of SAST and DAST/IAST testing come in as soon as the testing is conducted. Due to SAST and DAST tools producing a significant number of false positives, it is impossible to consume the reports generated by these existing tools without extended human curation.

Vulnerability assessment tools throw false positives as well. Vulnerability databases such as the National Vulnerability Database (NVD) report vulnerability data by mapping the vulnerability to the software packages (including a series of versions that are affected). Later, the vulnerability database providers may modify the content of the vulnerability databases, e.g., the mappings, sometimes months later. Vulnerability assessment tools often do not maintain state. Also, some intervening version of the vulnerable package may not be vulnerable. A well-designed tool can easily miss these gaps. Some packages are delivered as "tarballs" (i.e., an archive file) instead of RPMs (RPM package manager and .rpm files) or MSIs (Microsoft System Installers). Many vulnerability assessment tools look for installed RPMs and MSIs and miss the tarballs. As a result of these issues, vulnerability assessment tools manually curate the raw data from the vulnerability databases. This delays delivery of updates.

Further still, each layer of code presents its own issues for existing SCA and SAST tools. These existing tools can only analyze source code and have no ability to discover vulnerabilities in third party or supporting infrastructure code. SAST tools generate a lot of false positives and they do not have reachability into third party code. Another problematic issue for existing functionality is the need to use a different SAST tool for every language used to develop the application. Further, even if these different language based SAST tools are leveraged, it is cumbersome to merge semantic models of how the various tools, e.g., SAST tools, operate and function across different languages.

Another problem with existing vulnerability tools is reporting risk even if the application does not load a vulnerable package. A vulnerability may be present in the code on disk, but the underlying vulnerable code may not get loaded into memory. Often, the existing tools would report this vulnerability, though it poses no risk to the application. As a result, the risk numbers may be needlessly inflated by the existing tools.

Figure 2:
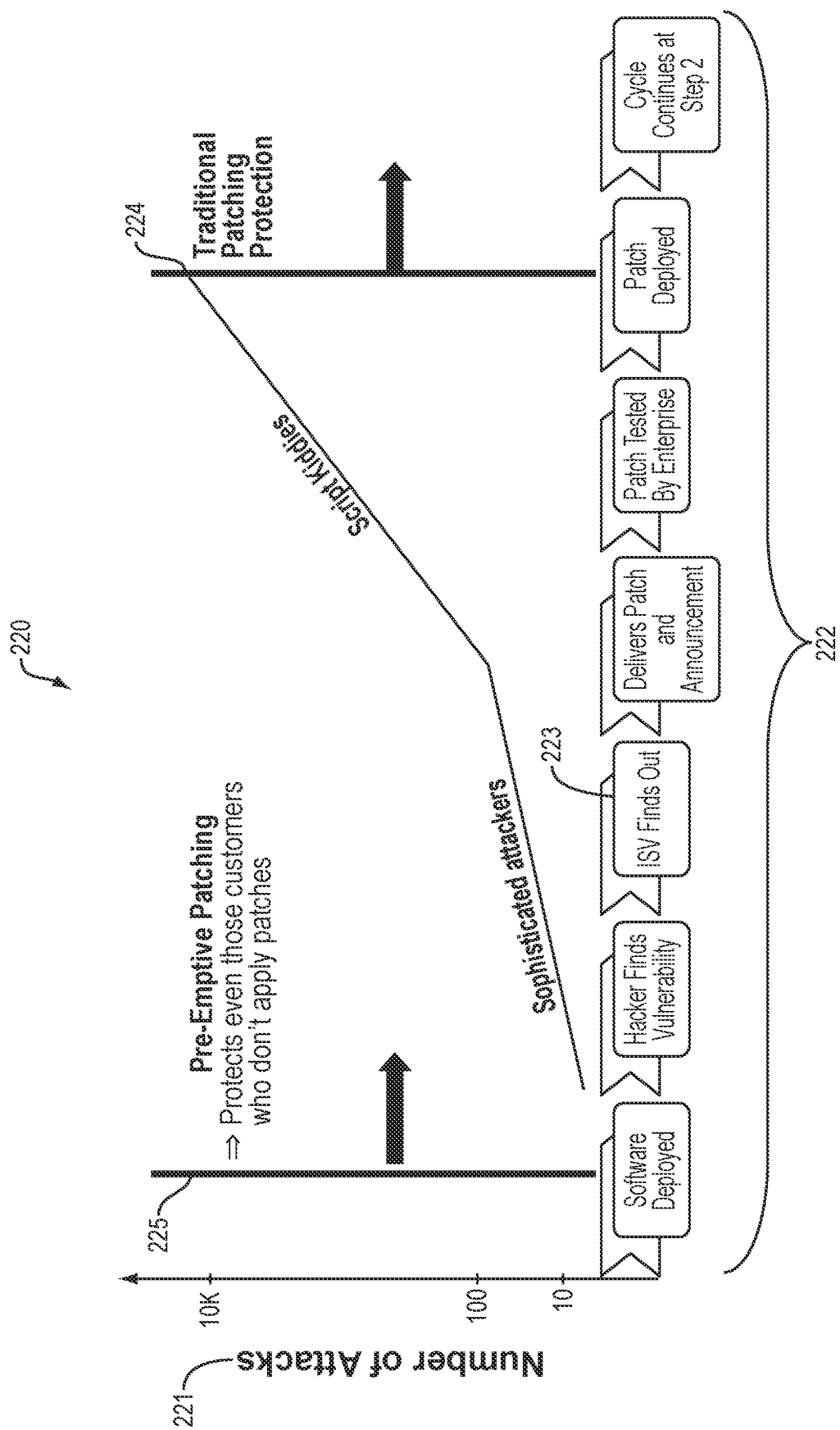
FIG. 2 is a plot showing the number of attacks occurring during computer application patching.

In addition to problems with vulnerability identification tools, the existing solutions for fixing vulnerabilities can also benefit from improvements. Application security can also be compromised by missing patches once an application gets deployed. An application that is declared to be safe may become vulnerable subsequently when it is deployed in production. FIG. 2 is a plot 220 showing the number of attacks 221 that occur during the time it takes to implement the patching process 222. Most independent software vendors (ISVs) will patch their vulnerable code as soon as possible so that all end-users of such code are not impacted by cyber attackers. As can be seen in the plot 220, it takes finite amounts of time from the time the vulnerability is announced 223 to the time the patch is released and to the time the patch is applied 224. As can be seen in FIG. 2, by the time traditional patching 224 is done, a large number 221 of attacks have occurred. In comparison, through use of embodiments, patching can be done at 225 to prevent the large number of attacks that occur using traditional patching.

Zero day vulnerabilities can weaken an application's security posture retroactively. Underlying infrastructure code may have lurking vulnerabilities that are discovered many years later. For example, Microsoft issued a patch in Windows OS 2012, almost 10 years after the OS code was first released for the recent print spooler vulnerability (https://msrc.microsoft.com/update-guide/vulnerability/CVE-2021-34527). A smart attacker who is under no obligation to announce the vulnerability could have easily been abusing the underlying vulnerability. One has to merely look at the Shadow Brokers (https://en.wikipedia.org/wiki/The_Shadow_Brokers) saga from 2016 to note that there are groups out there who take advantage of undisclosed vulnerabilities. Existing tools often do not discover zero day vulnerabilities and, after the zero day vulnerabilities are discovered, existing tools are slow to update their operations to reflect the existence of the newly discovered vulnerabilities.

Poor configuration can also weaken an application's security posture. As with any code, the associated configuration files can also have an adverse bearing on the security posture of an application. For instance, operating systems often support cryptographic algorithms such as MD5 which have been compromised. An end-user may inadvertently use such a compromised algorithm and weaken the application's security posture.

Conventional application security tools do not provide remediation advice for developers. Conventional tools may determine the URLs (or input/output interfaces) that are vulnerable, but do not provide remediation that leads back into the code. This leaves the developer of the code no better off.

Attempts have been made to solve the aforementioned problems, but these attempts have been insufficient. Some Application Security Testing (AST) vendors have attempted to address a handful of the issues described above by aggregating the results of several test tools and, then, using machine learning techniques to reduce the false positive noise. Unfortunately, due to the plethora of code and code configurations, even two sets of experiments conducted on different setups may not be identical. Therefore, any underlying machine learning model cannot really help.

Some vendors have tried to deploy an agent in some web application's hypertext transfer protocol (HTTP) pipeline to improve the false positive performance. Most such vendors study the HTTP request and response, but do not do so contextually. The goal of these vendors is to send non-fuzzed input followed by fuzzed input and then compare the HTTP response to detect differences. This examination can help, but it is not a deterministic approach for reducing false positives. For example, an application may execute a totally different structured query language (SQL) query in response to an attack, but not emit any telltale sign into the HTTP response path.

Some vendors try to accelerate the synchronization operation of their vulnerability data feeds, to say a weekly basis, but this too is very difficult to achieve. Most tools that scan the vulnerability databases have false positives and the ability of these tools to extract the package name from the vulnerability databases, e.g., a Common Vulnerabilities and Exposures (CVE) database, is fraught with false positives and needs manual curation. Manual curation delays delivery of accurate results for end-users.

Embodiments provide improvements to vulnerability assessment and remediation beyond the foregoing existing methods and solve the aforementioned problems that plague vulnerability posture of an application.

Figure 3:
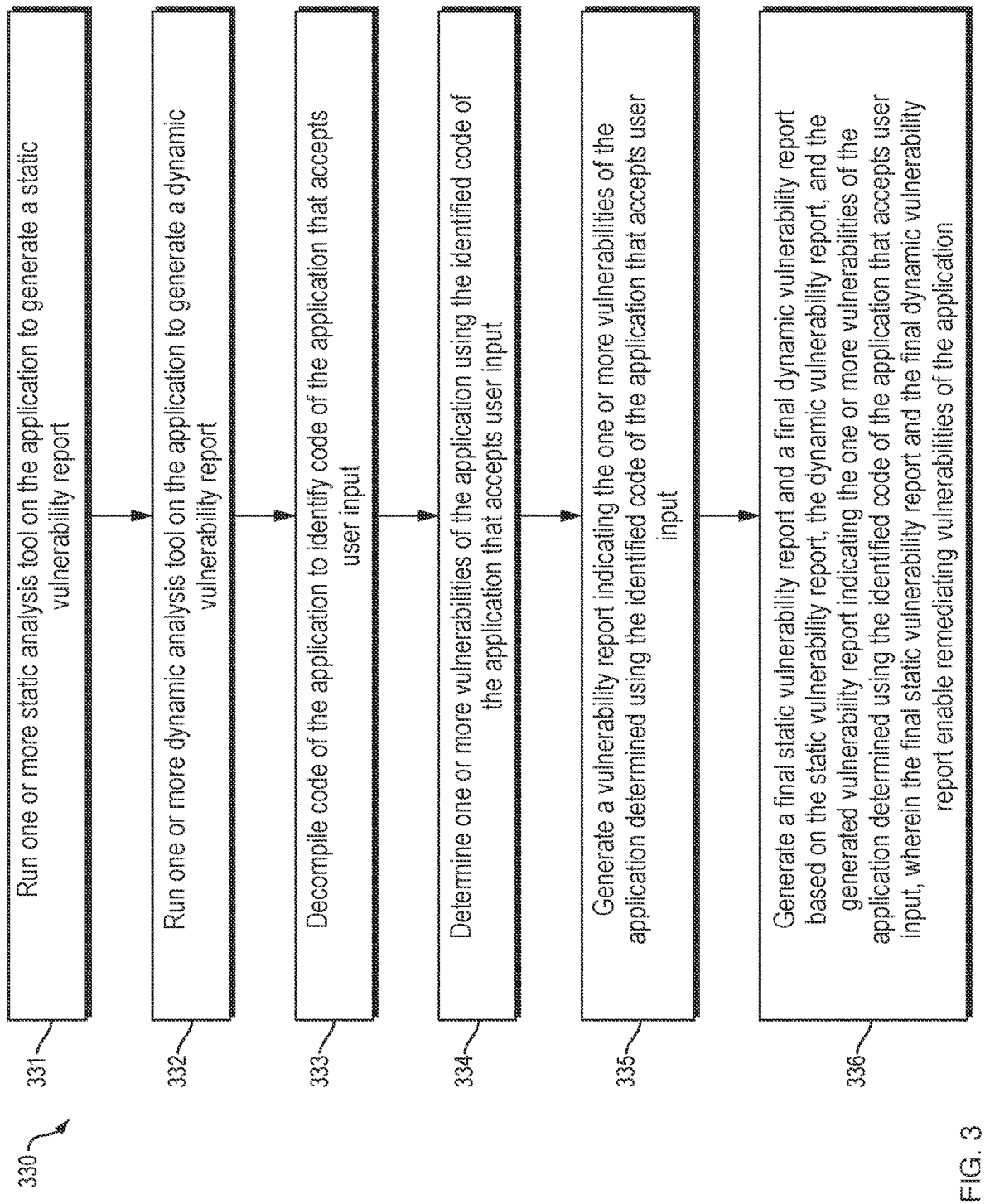
FIG. 3 is a flow chart of a method for assessing security vulnerability of an application according to an embodiment.

FIG. 3 is a flowchart of a method 330 for assessing vulnerability of an application according to an embodiment. The method 330 starts at 331 and runs one or more static analysis tools on an application to generate a static vulnerability report. Likewise, at step 332, the method 330 runs one or more dynamic analysis tools on the application to generate a dynamic vulnerability report. In an embodiment, the static analysis tools and the dynamic analysis tools comprise any such tools that are known in the art. For example, in an embodiment of the method 330, the one or more static analysis tools are at least one of: a source component analysis (SCA) tool and a software application security test (SAST) tool. Moreover, in an embodiment, the one or more dynamic analysis tools are at least one of: a dynamic application security test (DAST) tool and an interactive application security test (IAST) tool. In an embodiment of the method 330, the tools are used at steps 331 and 332 in the customary way to generate the static vulnerability report and the dynamic vulnerability report. The reports generated at steps 331 and 332 indicate vulnerabilities found in the application by the static analysis tools and dynamic analysis tools.

To continue, the method 330 decompiles code of the application at step 333 to identify code of the application that accepts user input. An embodiment utilizes disassemblers at step 333 to decompile the code. In an embodiment, the disassemblers are language specific disassemblers, such as javap, that are selected based upon the code of the application. According to an embodiment, decompiling 333 the code of the application includes decompiling Java pages of the application. In yet another embodiment of the method 330, decompiling 333 the code of the application comprises recursively decompiling the code to identify code of the application that accepts user input. The code of the application identified as accepting user input may be any such code as is known in the art. For instance, in an embodiment of the method 330, the identified code of the application that accepts user input is at least one of: a Uniform Resource Locator (URL) and an application programming interface (API).

Next, at step 334, one or more vulnerabilities of the application are determined using the identified code of the application that accepts user input. An embodiment of the method 330 utilizes the system 400, the system 500 and/or the system 660 described hereinbelow in relation to FIGS. 4, 5, and 6, respectively, to determine the vulnerabilities of the application using the identified code. An embodiment determines the one or more vulnerabilities of the application by fuzzing the identified code of the application that accepts user input. According to an embodiment, a contextual analysis of the application is performed at step 334 using the decompiled application to determine vulnerabilities of the application. Another embodiment of the method 330 determines, based on the decompiled code, input formatting accepted by the identified code of the application that accepts user input. For instance, such an embodiment may determine formatting for an input date as DD/MM/YYYY. This determined input formatting may be utilized at step 334 to determine the one or more vulnerabilities of the application through, for instance, dynamic analysis of the application.

After the vulnerabilities in the application are identified at step 334, the method 330, at step 335, generates a vulnerability report that indicates the one or more vulnerabilities previously determined at step 334. According to an embodiment, the report generated at step 335 is a report listing the vulnerabilities determined at step 334 in a structured format.

To continue, at step 336, the method 330 generates a final static vulnerability report and a final dynamic vulnerability report. The final reports are generated at step 336 based on (i) the static vulnerability report (generated at step 331), (ii) the dynamic vulnerability report (generated at step 332), and (iii) the vulnerability report that indicates the one or more vulnerabilities of the application determined using the identified code of the application that accepts user input (generated at step 335). The final static vulnerability report and the final dynamic vulnerability report enable remediating vulnerabilities of the application. For instance, based on the report, one or more vulnerabilities in the application may be fixed, or a feature of the application may be turned-off or disabled until a vulnerability can be fixed. Based on the reports, particular vulnerabilities to first target for fixing may be identified and highlighted to developers.

According to an example embodiment of the method 330, generating the final static vulnerability report and the final dynamic vulnerability report comprises removing at least one of duplicate vulnerabilities and false positive vulnerabilities from the static vulnerability report (from step 331) and the dynamic vulnerability report (from step 332). In other words, an embodiment of the method 330 generates the final static vulnerability report and the final dynamic vulnerability by removing duplicate vulnerabilities and false positive vulnerabilities from the originally determined static and dynamic reports. An example embodiment removes the false positives and the duplicate vulnerabilities based on the generated vulnerability report that indicates the one or more vulnerabilities of the application determined using the identified code of the application that accepts user input.

In an embodiment, the duplicate vulnerabilities and false positive vulnerabilities are removed from the static vulnerability report and the dynamic vulnerability report by first normalizing vulnerability findings in the static vulnerability report (from step 331) and the dynamic vulnerability report (from step 332) into standardized vulnerability findings. This normalizing puts each vulnerability in the original reports into a standardized, e.g., same, format. In turn, the duplicate vulnerabilities and the false positive vulnerabilities are removed by comparing the static vulnerability report and the dynamic vulnerability with the standardized vulnerability findings to the generated vulnerability report indicating the one or more vulnerabilities of the application determined using the identified code of the application that accepts user input. In such an embodiment, vulnerabilities in the report generated at step 335 are in the standardized format.

In an embodiment, normalizing the vulnerability findings puts each vulnerability finding into a same desired format. Because each finding is in the same format, each normalized finding can be compared and any repeat findings can be removed. In this way, duplicate vulnerability findings can be removed. This could not be done using existing methods where vulnerability findings are in a multitude of different formats.

An embodiment of the method 330 normalizes the vulnerability findings by first, parsing the vulnerability findings in the static vulnerability report and the dynamic vulnerability to identify keywords in the vulnerability findings. An embodiment accomplishes this parsing using natural language tools to identify desired keywords. An embodiment may use existing natural language tools, such as BlazingText, to identify the desired keywords. To continue, the vulnerability findings in the static vulnerability report and the dynamic vulnerability report are reformatted into the standardized vulnerability findings based on the identified keywords.

In an embodiment, the vulnerability report generated at step 335 is accepted as correct, i.e., it is accepted as a true indication of vulnerability findings in the application. Moreover, this report generated at step 335 may also have its vulnerability findings in a normalized structure. When the findings in the report generated at step 335 are in the normalized structure, it allows the findings from the original static report (from step 331) and the original dynamic report (from 332) to be compared to the report from step 335. Because, in an embodiment, the report generated at step 335 is accepted as true, when the reports from steps 331 and 332 are compared to the report from step 335, they should ultimately match. However, if there is any vulnerability finding in the report from step 331 or the report from step 332, that is not in the report from step 335, such a finding is considered a false positive and it is removed to generate the final reports at step 336. Similarly, if there is a vulnerability in the report generated at step 335 that is not found in the report from step 331 or the report from step 332, such a finding is considered a false negative and is added to generate the final reports at step 336.

Figure 4:
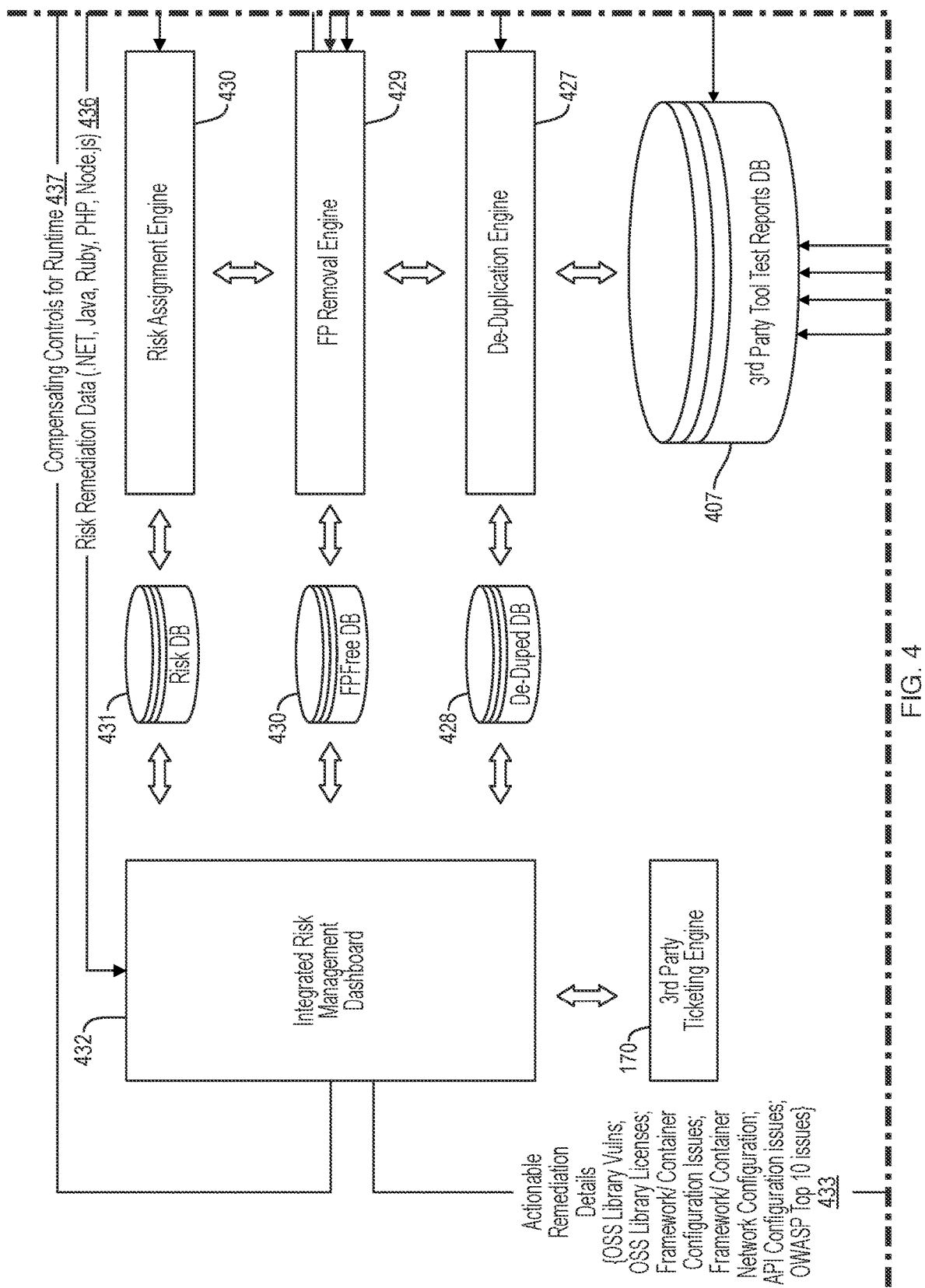
FIG. 4 is a block diagram of a system in which embodiments may be implemented.
Figure 4:
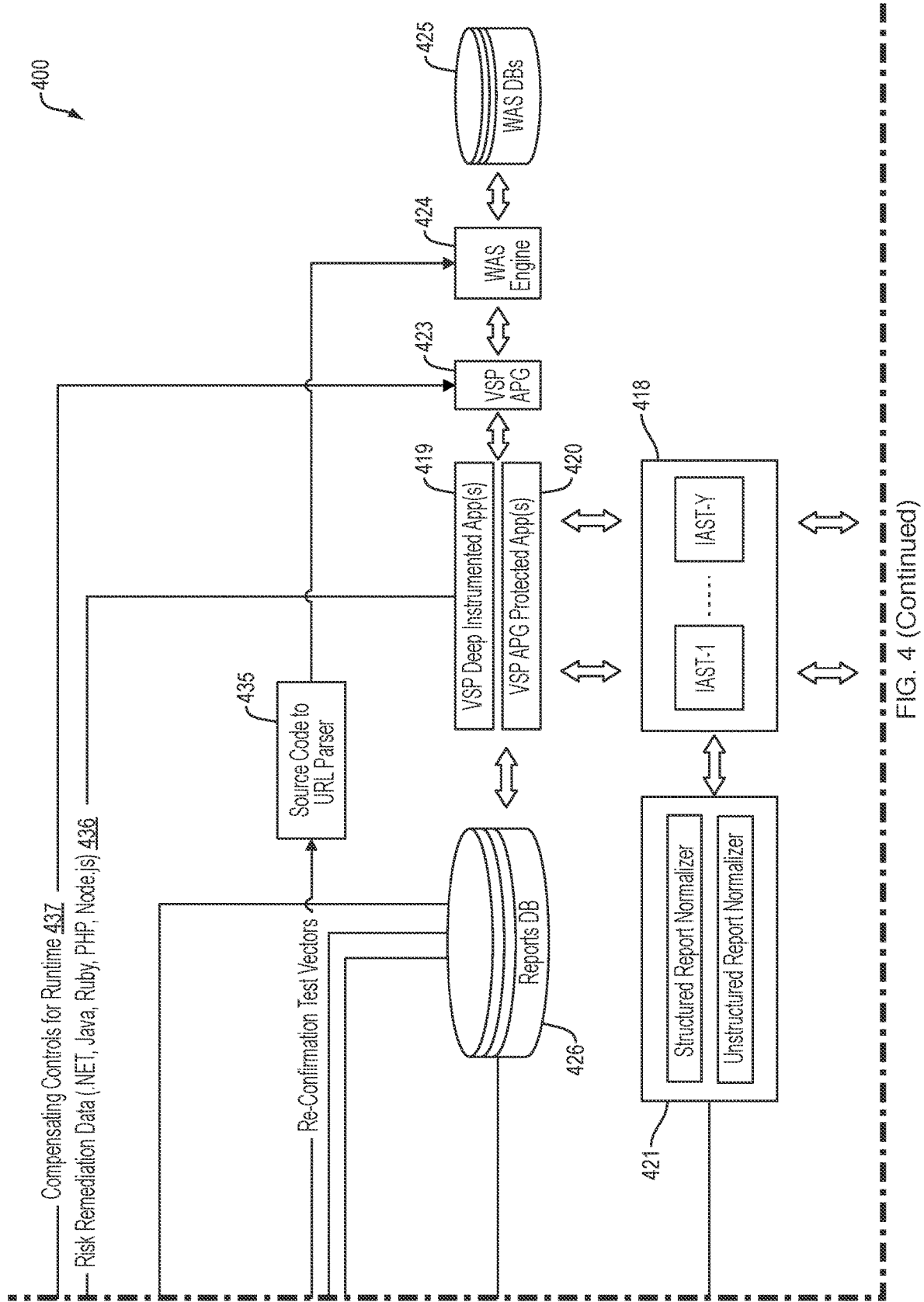
Figure 4:
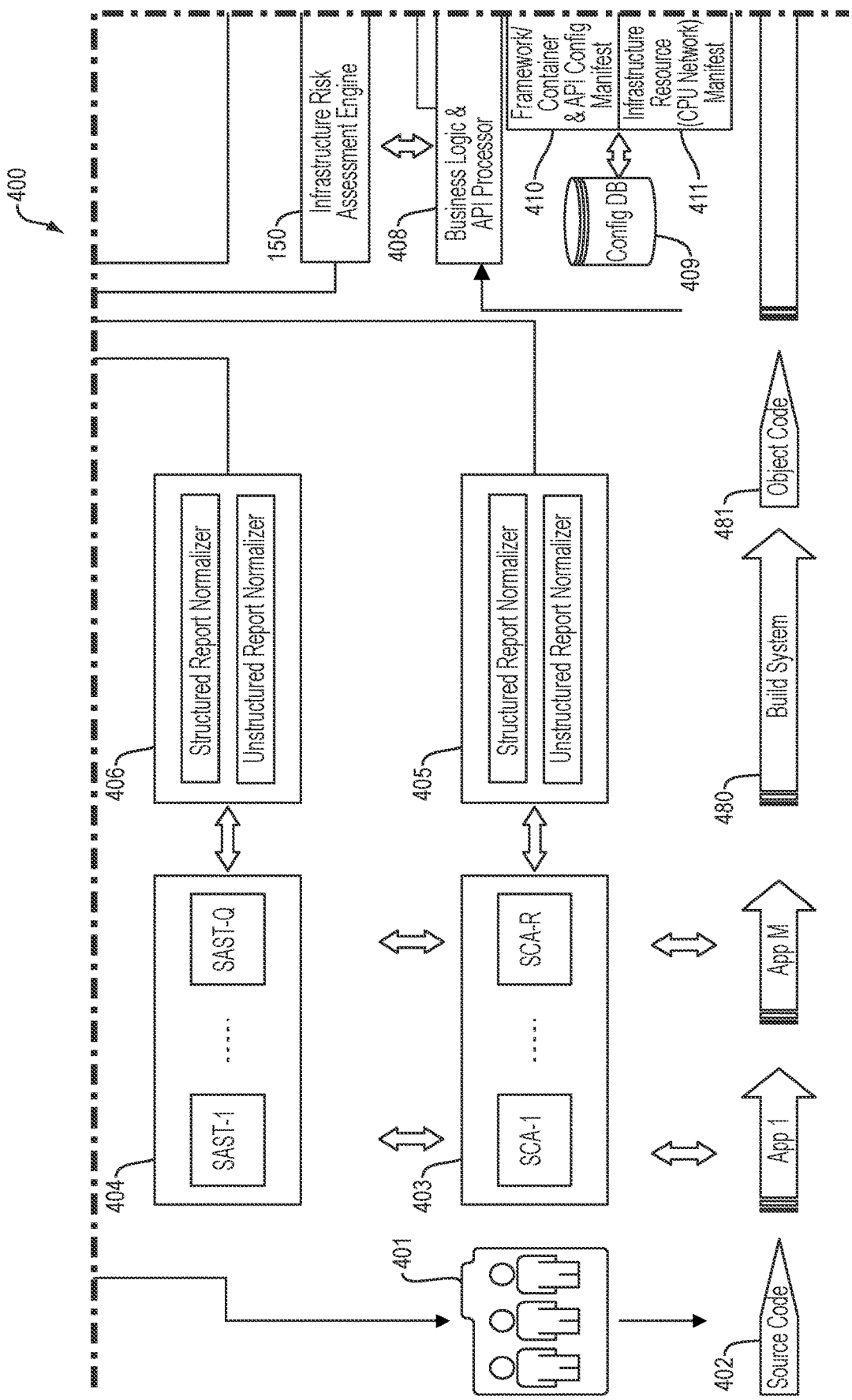
Figure 4:
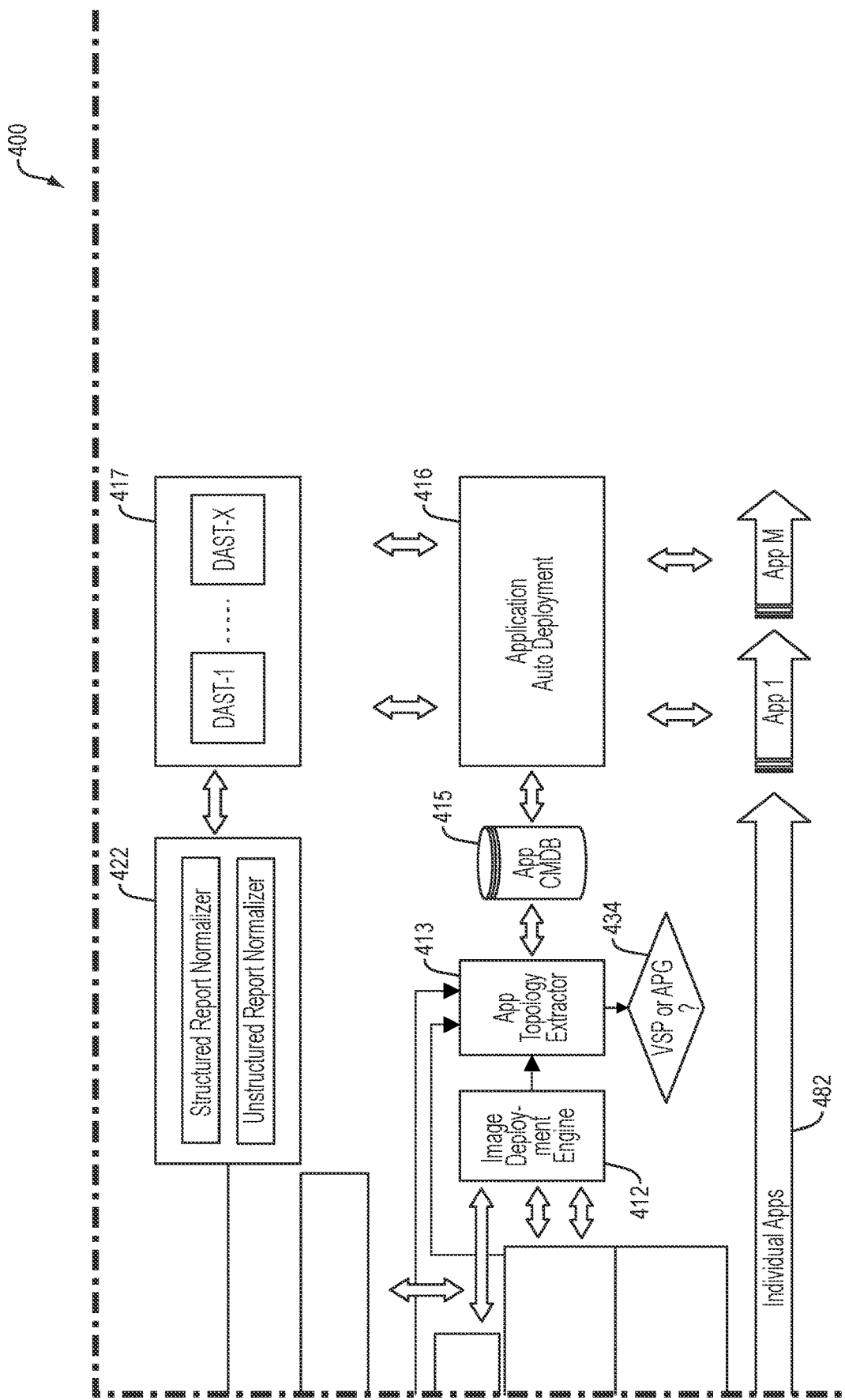

FIG. 4 is a block diagram of a system 400 that may implement the embodiments described herein.

The system 400 starts with the user(s) 401 providing the source code 402 of an application. Once the source code 402 of the application's business logic is ready to be compiled and tested, the end-user 401 organization's one or more preferred source component analysis (SCA) tool of third-party libraries 403 as well as the SAST 404 tools are pressed into action. The one or more SCA 403 and SAST 404 tools generate their individual reports.

Since each tool 403 and 404 generates its report in its custom format, the data produced by the said SCA 403 and SAST 404 tools is next normalized 405 and 406 before the corresponding results can be consumed by the system 400. The normalizing 405 and 406 makes each tool's (403 and 404) report available in a consistent format where the underlying vulnerability type, URL, and attack data are mapped into individual objects. After normalization, each vulnerability finding from the reports generated by the tools 403 and 404 may be written out in a standard format, such as:

{Vendor Name, Tool Type, Test Date, Application Name and Version, Affected URL(s), Vulnerability Type, raw fuzz data, HTTP Input, HTTP Response, False Positive Status}

In turn, the normalized 405 and 406 reports from the one or more tools 403 and 404 used by the end-user organization are pushed into the central third party database 407.

Next, the end-user's 401 Continuous Integration and Continuous Development (CICD) Pipeline starts to build 480 the sources and any third-party objects 481 into the full individual application 482.

The dynamic testing part of the system 400 pre-processes 408 the application's 482 object code to extract the portions of the application 482 that accept user input (e.g., URLs and APIs offered up by the application 482). This automatic extraction is achieved by decompiling the object code 481 and identifying the various locations in the code that accept user input. This process of decompiling and hunting for portions of the application that accept user input allows the system 400 to achieve an extremely deep crawl that does not miss out on any interfaces on which the application 482 may receive input from end-users. This in turn helps to remove false negatives whether these are in application's 482 business logic or the underlying application 482 infrastructure or even in the OS runtime libraries; even if the vulnerabilities are disclosed or not, patched or not, and even if the application 482 is incorrectly configured or not.

The system 400 provides the configuration/deployment manifest database 409 of the application 482 and leverages the end-users' 401 preferred orchestration tools (410, 411, and 412). These orchestration tools (410, 411, and 412) may deploy the system's 400 Application Topology Extraction (ATE) 413 tool to identify elements of the application 482, e.g., frameworks, for further dynamic testing. The ATE 413 tool also determines 434 if the customer wants to implement VSP (deep instrumentation protection) or APG (application protection gateway—light instrumentation that protects at the HTTP level) 1201. Assuming, deep instrumentation is desired, the ATE 413 generates an App configuration management database (CMDB) 415 which is used to deploy 416 the application's 482 HTTP pipeline for deep instrumentation. In an embodiment, the ATE 413 is implemented in the system 400 as described in the applicant's Indian Provisional Patent Application No. 202141002208 filed Jan. 18, 2021 and/or applicant's U.S. Provisional Patent Application No. 63/155,466 filed Mar. 2, 2021. Deep instrumentation of various interpreters used by the application's 482 code base is described in the applicant's U.S. Pat. No. 10,447,730 issued on Oct. 15, 2019; U.S. Pat. No. 10,354,074 issued on Jul. 16, 2019; U.S. Patent Publication No. 2020/0042714 published on Feb. 6, 2020; U.S. Patent Publication No. 2019/0138725 published on May 9, 2019; and/or U.S. Provisional Application No. 63/133,173 filed on Dec. 31, 2020.

Once the application 482 is deployed 416 and instrumented, the system 400 implements running the user's 401 preferred DAST 417 and LAST 418 tools. This allows the system 400 to collect two reports from one test run, —one from the original DAST 417 and LAST 418 tools and one from the system's instrumentation stream (419 and 420). The reports from the tools 417 and 418 are normalized 421 and 422 and stored in the report database 407. As with the SCA 403 and the SAST 404 tool test results, the normalized results from the blocks 421 and 422 may be reported into the central database 407 in the format shown below:

{Vendor Name, Tool Type, Test Date, Application Name and Version, Affected URL(s), Vulnerability Type, raw fuzz data, HTTP Input, HTTP Response, False Positive Status}

The deep instrumentation tools 419 and 420 generate a report indicating the vulnerabilities in the application based upon the App CMDB 415 and the report is stored in the database 426. In this way, a vulnerability report is generated by the blocks 419 and 420 that is based ultimately on the previously identified elements of the application 482 code that accept user input. An embodiment of the system 400 accepts the report from the blocks 419 and 420, as true. In such an embodiment, the system's 400 deep instrumentation 419 and 420 does not generate false positives, the two simultaneous reports (one report generated by the block 419 and 420 and one report generated by the blocks 418 and 417 [before normalization]) allow the invention to automatically remove false positives from each of the end-user's preferred DAST 417 and IAST 418 tools. In an embodiment of the system 400, the instrumentation blocks 419 and 420 may embody the functionality described in applicant's U.S. Pat. No. 10,447,730 issued on Oct. 15, 2019; U.S. Pat. No. 10,354,074 issued on Jul. 16, 2019; U.S. Patent Publication No. 2020/0042714 published on Feb. 6, 2020; U.S. Patent Publication No. 2019/0138725 published on May 9, 2019; and/or U.S. Provisional Application No. 63/133,173 filed on Dec. 31, 2020. Such functionality may be used to identify vulnerabilities. Further, the blocks 419 and 420 may implement the functionality described hereinbelow in relation to FIGS. 5 and 6. Further still, the blocks 419 and 420 (and the functionality implemented by the blocks 419 and 420) may be employed at steps 334 and 335 of the method 330 described hereinabove in relation to FIG. 3 to determine vulnerabilities in an application using code of the application that accepts user input and generate a vulnerability report.

Given that there are no false positives reported by the functionality in applicant's U.S. Pat. No. 10,447,730 issued on Oct. 15, 2019; U.S. Pat. No. 10,354,074 issued on Jul. 16, 2019; U.S. Patent Publication No. 2020/0042714 published on Feb. 6, 2020; U.S. Patent Publication No. 2019/0138725 published on May 9, 2019; and/or U.S. Provisional Application No. 63/133,173 filed on Dec. 31, 2020, which are generally referred to herein as "VSP", there is no manual curation involved in the system 400. As a result, the various vulnerability reports from not just the tools 419 and 420, but also from third party tools (404, 404, 417, and 418), after they are processed using the functionality of the system 400, are ready to be consumed shortly after the test concludes. This agility helps developers not have to encounter bugs from a feature long after the developers have moved away from developing code for that feature.

The system 400 may also leverage the Web Attack Simulator (WAS) tool 424 and 425 (details of which are described in applicant's Indian Patent Application No. 202141002185 filed Jan. 18, 2021 and applicant's U.S. Provisional Patent Application No. 63/155,464 filed Mar. 2, 2021) to generate more fuzz for the targeted application 482. This fuzz is used in the blocks 419 and 420 to generate the vulnerability reports that are stored in the database 426. In an embodiment, the system's 400 application protection gateway leverages the open-source MODSEC CRS solution 423 tool in the system's deep instrumentation of the application 482 implemented by the blocks 420 and 419 to exercise as many URLs or I/O interfaces in the application 428 as possible. Such an embodiment ensures user input in the HTTP Request from every URL is fuzzed. In an embodiment, the result of such testing is reported into the reports database 426.

To continue, the system 400 implements a de-duplication engine 427 that compares the URLs reported (in the reports stored in the database 407) by the end-user's one or more SCA 403, SAST 404, DAST 417, and IAST 418 tools with the data in the reports database 426 to collect a per URL (or I/O interface) indication of vulnerabilities in the application 482 and to present a consolidated de-duped report that is stored in the database 428. De-Duplication involves identifying the URL (or I/O interface) and vulnerability being reported by each vulnerability assessment tool for a given application and ensuring every vulnerability is only reported once despite being identified by multiple different tools.

The system 400 also implements a false positive removal engine 429 to eliminate the false positives in the SCA 403 and SAST 404 reports stored in the database 407. The reports with eliminated false positives are stored in the database 430. The WAS and VSP infrastructure (425, 424, 423, 419, 420 and 426) is used to attack the application under test with the payload used by the end-user's preferred fuzzing tool. This allows the false positive removal engine 429 to deterministically conclude if the third-party tool reported a false positive or not. An embodiment of the system 400 may also take vulnerabilities or URL/APIs associated therewith from the false positive removal engine 429 and use the source code to URL parser 435, to ensure that each point in the application 482 that accepts user input has been fuzzed.

The risk assessment engine 430 assesses the vulnerabilities present in the code and reports these into the risk database 431. It is important to note that some packages that are present in the code, but not being used in the application, may be appropriately reported as such by the risk assessment engine 430. This is in contrast with the end-user's 401 existing vulnerability assessment tools 403, 404, 417, and 418. The risk engine 430 can provide recommendations on what code on disk is not being used to reduce the overall posture of the workload.

The integrated risk management dashboard 432 leverages the data in the false positive free database 430, de-duped database 430, and risk database 431 to recommend remediation. This allows the developer 401 to be in a position to rectify defects in the code moments after the testing is concluded. An embodiment of the system 400 may also develop 437 compensating controls for runtime to apply a fix in the APG to compensate for an error. Such a fix may be tested so as confirm effectiveness. Further, an embodiment may send risk remediation data 436 to the dashboard 432 to prepare vulnerability indications. This remediation data 436 may be any such data related to a vulnerability, e.g., a URL.

Embodiments may employ functionality described in detail in applicant's U.S. Pat. No. 10,447,730 issued on Oct. 15, 2019; U.S. Pat. No. 10,354,074 issued on Jul. 16, 2019; U.S. Patent Publication No. 2020/0042714 published on Feb. 6, 2020; U.S. Patent Publication No. 2019/0138725 published on May 9, 2019; and/or U.S. Provisional Application No. 63/133,173 filed on Dec. 31, 2020 to identify vulnerabilities based upon the decompiled application and the identified portions of the application that accept user input. For instance, such functionality may be utilized in the blocks 419 and 420 in the system 400 described hereinabove in relation to FIG. 4 and at step 335 of the method 330 described hereinabove in relation to FIG. 3.

Figure 5:
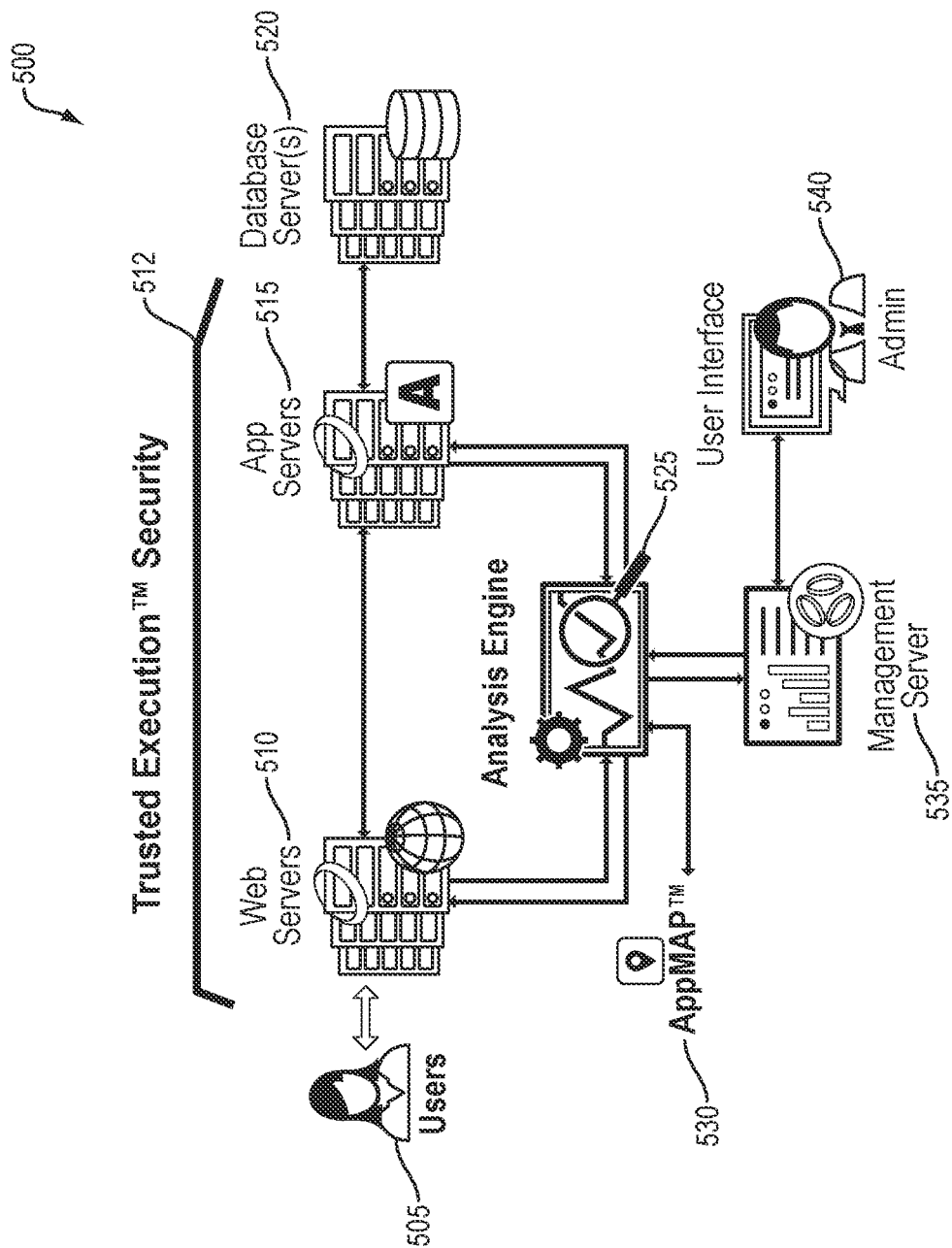
FIG. 5 illustrates an example system for protecting an application from vulnerabilities that may be used in embodiments.

An embodiment utilizes the system 500 to identify vulnerabilities in an application. For instance, the system 500 may be used at step 335 of the method 330 to identify vulnerabilities in the application based on the code of the application that accepts user input. FIG. 5 is a diagram of an example trusted execution system 500. The system 500 of FIG. 5 instruments probes into a computer application executed at a customer endpoint (platform) 512 by an associated user 505. The probes are software instruction inserts into the computer application (e.g., by a dynamic binary analysis engine or byte code instrumentation engine) at load or runtime time configured to capture activities of the executed computer application at runtime. The system 500 instruments the probes (e.g., via an instrumentation engine) on every instance of the executed computer application at the customer endpoint 512, including web servers 510, application servers 515, and database servers 520. The computer application may be running as a compute instance located in a cloud or on premise data center. The system 500 may instrument the probes on the servers (e.g., 510, 515, 520) implemented in any OS platform, including Windows and Linux, and in any programming language, such as .Net, Java, and PHP. The instrumented probes monitor (in real-time) the network of the customer endpoint 512 at runtime, and report operations by applications on file systems, registries, processes/threads, OS kernels, and such, to an analysis engine 525.

The instrumented probes generate events to establish trust of the components affected by the operations on the file systems, registries, applications, OS kernels, network interface card, I/O devices (e.g., mouse, keyboard, Bluetooth devices, and IR devices), memory, and the like. The components affected by the operations may include an executable file, a script file, a configuration file, a process, a thread, a jump table, a registry hive, a registry key, network traffic, private memory, and shared memory, amongst other examples. The compute components may be placed in a quarantine state (e.g., removing access permissions from the compute components, excluding the compute components from a trusted process/thread database, and such) by an application and network hardening subsystem at the customer endpoint 512. The application and network hardening subsystem may perform actions to establish trust with the compute components, including, at least one of: scanning code sections of the one or more affected compute components for known malware, statically and dynamically analyzing code sections of the one or more affected compute components for cache operations, executing watcher processes that monitor and guard a range of shared memory accessed by the operation, validating the one or more affected compute components periodically against a signature database containing file checksums for the one or more compute components, validating code sections of the one or more affected compute components against a cache of code sections using memory checksums, and validating the one or more affected compute components periodically against a cache of jump tables using memory checksums. The instrumented probes execute at the customer endpoint 512 with minimal performance impact on the functions of the customer endpoint 512.

The instrumented probes communicate with the analysis engine appliance 525 to apply security policies to analyze the generated events to further establish trust in the affected compute components and identify any vulnerabilities therein. The analysis engine 525 is coupled to an appmap database 530 that stores original, uncorrupted copies of some of the compute components. The appmap database 530 may include a plurality of data including: (1) control flow (extracted valid branches from binary code that can be enforced during runtime); (2) package (decomposed application, e.g., RPM, MSI, and checksum); (3) libraries (decomposed executables used to find library dependencies); (4) scripts (established allowed/disallowed combinations of interpreter and script); (5) runtime memory protection (Inline protection from host memory abuse); (6) directory and file control (captured directories and files accessed by applications during runtime); (7) local file inclusion (captured directory paths and web roots for object code files); (8) remote file inclusion (captured allowed destinations for application redirects); (9) interpreter verbs (captured allowed syntax from a range of interpreters, e.g., SQL, JavaScript, OS commands, etc.); and (10) continuous authorization (assigns stronger authentication for specific application URLs).

Security policies may be implemented by a customer administration at the user interface 540 to the management server 535 of the system 500 based on security technical implementation guides (STIGS) or other security standards. The security policies define callback routines that the analysis engine appliance 525 executes to mitigate results of the operation, if the applied security policies do not establish trust in the affected compute components. Based on the callback routines, the analysis engine appliance 525 may terminate one or more processes or threads associated with the operation, move the one or more affected compute components to a quarantine area, restore a valid copy of the one or more affected compute components (e.g., from the appmap database 530), load one or more patches to remedy the one or more affected compute components, report the operation and the one or more affected compute components (e.g., via the user interface 540 to the management server 535), and such.

Figure 6:
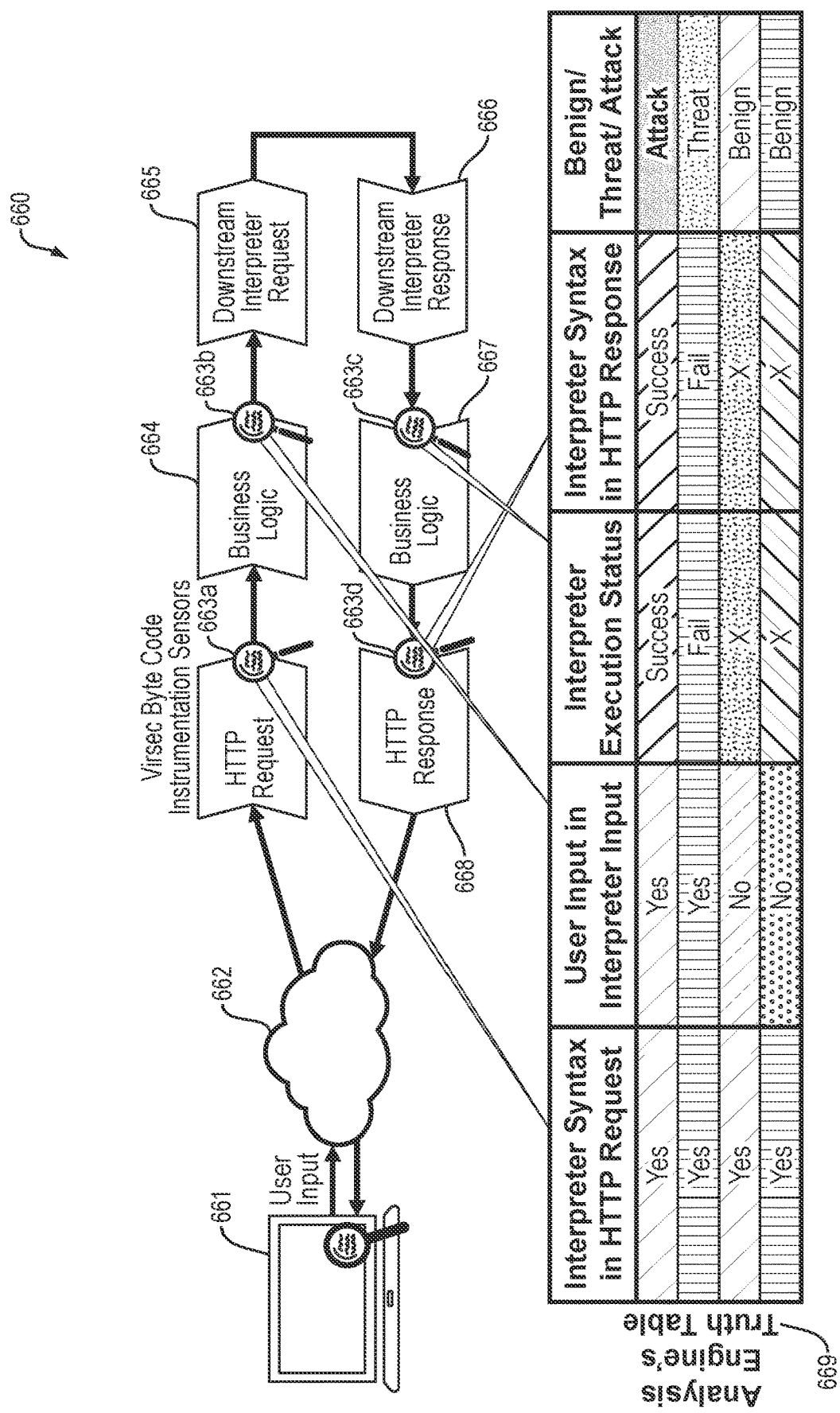
FIG. 6 illustrates functionality of a system used to identify malicious action that may be employed in embodiments.

FIG. 6 illustrates functionality of a system 660 that may be used in embodiments to identify malicious action in an application. Such functionality may be utilized in the blocks 419 and 420 of the system 400 described hereinabove in relation to FIG. 4 and at step 335 of the method 330 described hereinabove in relation to FIG. 3.

The system 660 processes a user input 661 HTTP request (which is received by the network 662) at a server computing device (not shown) that includes byte code instrumentation sensors 663a-d. The user input 661 HTTP request is processed by the business logic 664 and induces a downstream interpreter request 665. The request 665 induces a downstream interpreter response 665 which is processed by the business logic 667 to create the HTTP response 668 that is sent back to the user 661 via the network 662. Throughout these steps, the byte code instrumentation sensors 663a-d collect data which is analyzed by an analysis engine, e.g., the engine 525 of FIG. 5, in accordance with the truth table 669 to determine if there is any malicious action occurring. Such functionality can be employed in embodiments as part of testing an application to identify vulnerabilities therein. For instance, while the system 660 is depicted as receiving input from a user 661, the system 660 may also utilize fuzz data to conduct a dynamic analysis of an application to identify the application's vulnerabilities.

The functionality of the system 660 provides significantly deeper analysis of an application in comparison to existing tools. For instance, an existing tool may only consider the interpreter syntax in the HTTP request 661 when determining if the request 661 is malicious, but the system 660 goes further and looks to the actual resulting actions taken by the application, e.g., downstream interpreter request 665, downstream interpreter response 666, and business logic 667 response, in response to the input 661 to determine if there is a vulnerability.

Embodiments have numerous advantages compared to the existing functionality for vulnerability assessment. Whereas the disparate existing tools provide vulnerability reports in unique formats, embodiments provide normalized vulnerability findings. Embodiments use a sophisticated Natural Language Processing (NLP) technique to parse the PDF/HTML, reports generated by existing tools to clearly identify and extract the desired data from each tool's report. For instance, an embodiment may extract the following data:

{Vendor Name, Tool Type, Test Date, Application Name and Version, Affected URL(s), Vulnerability Type, raw fuzz data, HTTP Input, HTTP Response, False Positive Status} and store the extracted data in a standardized format. Such functionality enables de-duplication and report comparisons.

Embodiments eliminate false positive vulnerability findings. The deep instrumentation implemented by embodiments provides access not only to the code generated at runtime by the end-user's application's business logic, for each downstream interpreter used within the application, but also the interpreter's return status after said code is executed. This allows an analysis engine used in embodiments to determine the status of an attack without having to make assumptions on how the application will process user input. This direct visibility into the code and its execution status prevents embodiments from having to make guesses on these two artifacts which, in existing methods, generate false positives.

Embodiments also eliminate false negatives. Embodiments disassemble the end-user application using language appropriate tools, e.g., disassemblers such as javap, and, as such, embodiments virtually have the source code in hand. Then, by using sophisticated NLP tools that recognize framework specific artifacts, embodiments identify all functions in the source code that accept user input. For example, code written in Java can be disassembled using the "javap" (https://docs.oracle.com/javase/7/docs/technotes/tools/windows/javap.html) command. Having crawled the application successfully using language appropriate tools to identify code that accepts user input, the embodiments (which may use the web attack simulator 424) can compose precise context-specific stress for each input of the application. This helps to eliminate false negatives since every user input gets context appropriate as well as totally inappropriate input fuzzed.

Embodiments are significantly more agile in comparison to existing methods. By implementing deep instrumentation through use of the identified code of the application that accepts user input, embodiments do not produce false positives and, as a result, the end-user gets the benefit of obtaining test results without going through a lengthy process of manual curation and verification. This means that the results of vulnerability testing are available shortly after the testing is completed. This also means that the developer does not have to perform context switching from another feature and the tester does not have to setup the test bed all over again.

Advantageously, embodiments also eliminate false positives in vulnerability assessments. The vulnerability assessment provided by embodiments extracts the vulnerability (CVE-Package) data directly from the NVD and does not require any manual curation. This lack of manual intervention allows the CVE data to be processed and recalibrated every day. Therefore, if the NVD changes the status of a vulnerability on a given day, that status can be reflected by embodiments the very next day.

Figure 7:
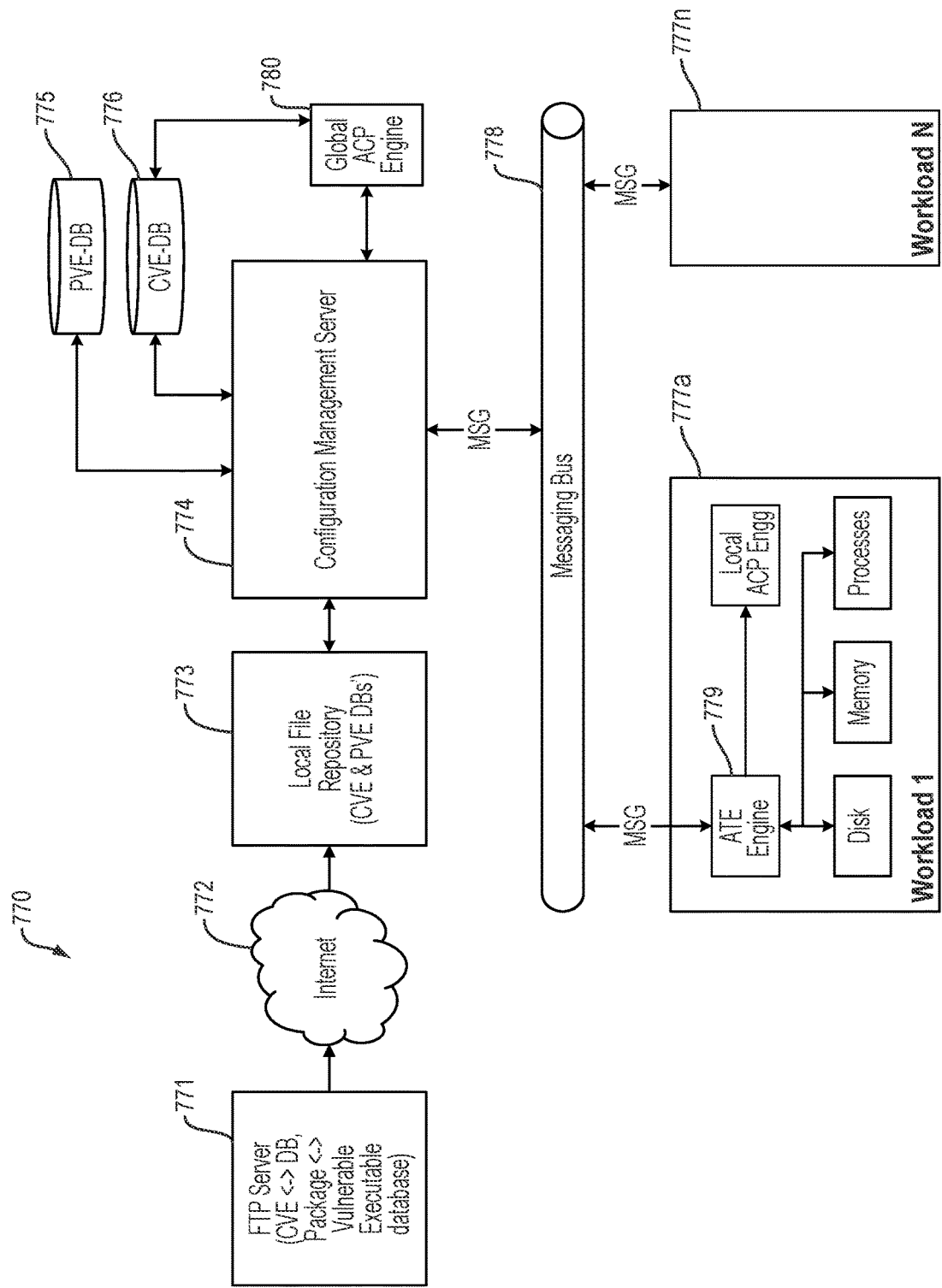
FIG. 7 is a block diagram of a vulnerability tracking system that may be employed in embodiments.

FIG. 7 illustrates a system embodiment 770 where data from the NVD is obtained to update the vulnerability assessment performed by embodiments. The system 770 places the CVE<→Package (or CVE-DB) and the Package<→Vulnerable Executable (or PVE-DB) Database into its FTP server 771 daily. The end-user's software upgrade repository (called the Local File Repository, or LFR) 773 pulls the two raw databases 771, via the network 772, into the Configuration Management Server (CMS) 774. The CMS 774 processes the raw data and pushes it into the PVE database 775 and CVE database 776. In an embodiment, a new feed from the one or more vulnerability databases 771 is received and processed every day in this way. This allows embodiments to eliminate false vulnerability findings and ensure that the latest information is used when assessing vulnerability.

Embodiments also provide a dynamic assessment of risk in comparison to existing risk assessment solutions. In an embodiment, e.g., the system 400, the ATE 413 identifies (i) the packages (RPM/MSI), (ii) executables within those packages, and (iii) processes that load such executables and libraries into memory. This allows such an embodiment to distinguish between active and quiescent risk. This is very helpful to end-users because there is no need to rush and patch quiescent code on an urgent basis.

Further, returning to FIG. 7, in the system 770 embodiments, each workload 771*a-n* connects to the central management server (CMS) 774 via the bus 778 and provides a list of packages and executables (which may be identified by the ATE 779) present and running on the workload 777*a*. The global application control policy (ACP) engine 780 (which may be implemented as described in applicant's U.S. Provisional Application No. 63/190,099 filed on May 18, 2021) then queries the CVE database 776 to first identify the vulnerable packages in the workload 777*a* and then queries the PVE DB 775 to find the executables (including libraries) of the workload 777*a* in which the vulnerability is located. The CMS 774 then compares the list of running processes from the workload 777*a* and compares this list with the list of known vulnerable executables which is stored in the repository 773. If that executable is active on that workload 777*a*, the risk posture for active vulnerabilities is bumped up. If the executable is not running, then an indicator, e.g., a score that may be provided by embodiments, of quiescent vulnerability is updated Application security is often compromised by missing patches and zero-day vulnerabilities. Existing methods do not update their databases of known vulnerabilities and this often leads to missing vulnerabilities when assessing an application. In contrast, embodiments utilize a vulnerability assessment tool packaged with embodiments that uses daily feeds from vulnerability databases to continuously identify vulnerability packages, particularly the active packages.

Additionally, the WAS and associated deep instrumentation infrastructure implemented by embodiments (e.g., the components 425, 424, 423, 419, 420, and 426) ensures that the code is as fully exercised as possible. This shakes out vulnerabilities in business logic, infrastructure, and OS code and developers get notified of the root cause. The root cause analysis facilitates early remediation of vulnerabilities.

Figure 8:
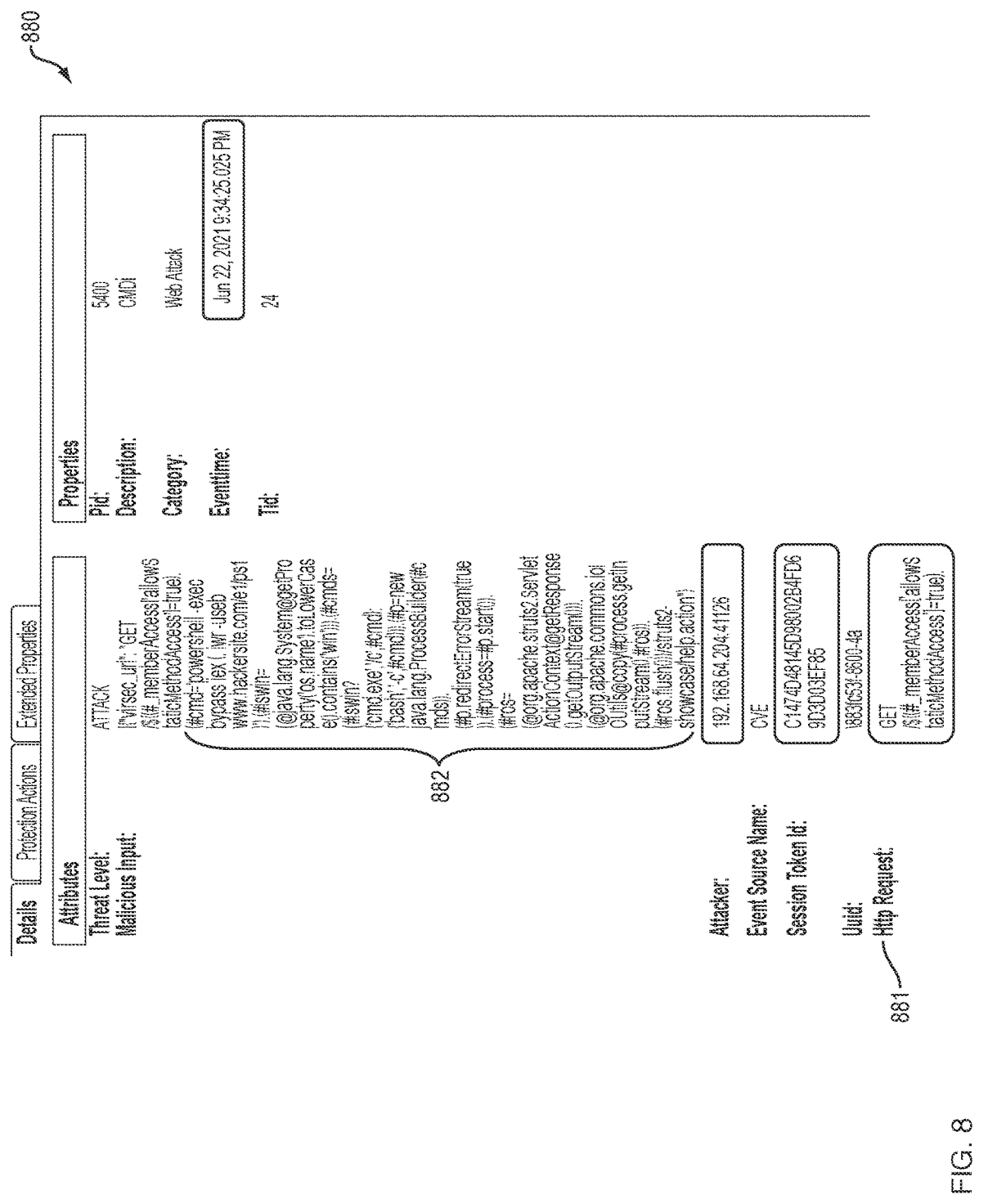

Embodiments also provide remediation advice for developers. Embodiments can generate detailed reports on each attack. For instance, in an embodiment the WAS and associated deep instrumentation infrastructure (425, 424, 423, 419, 420, and 426) is configured to generate such reports on each attack. For example, FIG. 8 illustrates a report 880 that indicates the originally attacked URL 881 and the malicious payload used to attack 882. This information is highly actionable for the developer who can use this information to identify the exact file and the exact location in the file that was targeted.

Embodiments provide tight integration into build systems and a code build can trigger full end to end automated vulnerability testing using the embodiments described herein. Further, an embodiment can provide compensating controls that allow operations teams to protect against known vulnerabilities that could not be addressed before code had to be released.

Figure 9:
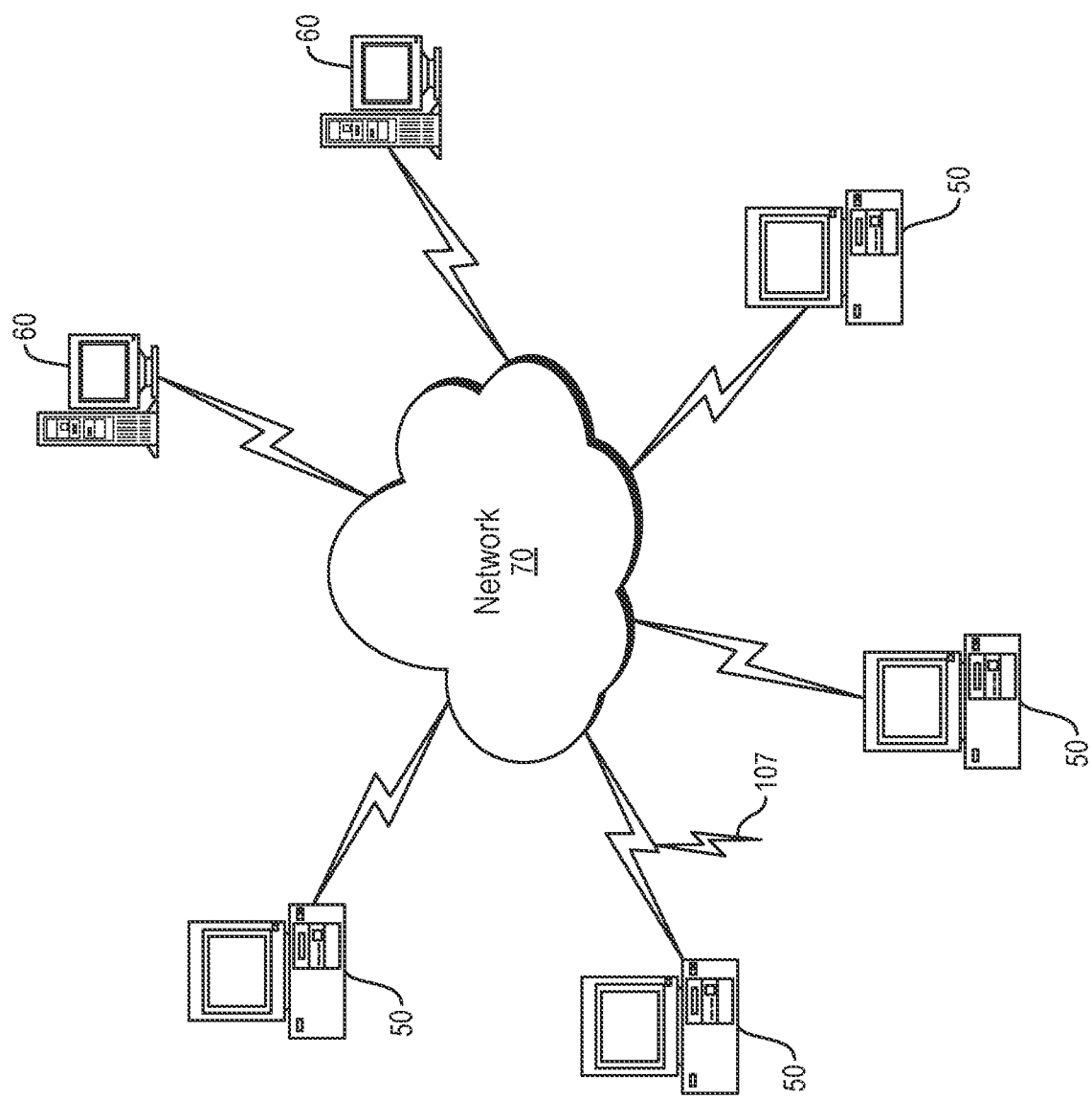
FIG. 9 illustrates a computer network or similar digital processing environment in which embodiments may be implemented.

FIG. 9 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 and/or servers 60 may be configured, alone or in combination, to implement the embodiments described herein, e.g., the method 330, the system 400, the system 500, and the system 770, amongst others. The server computers 60 may not be separate server computers but part of cloud network 70.

Figure 10:
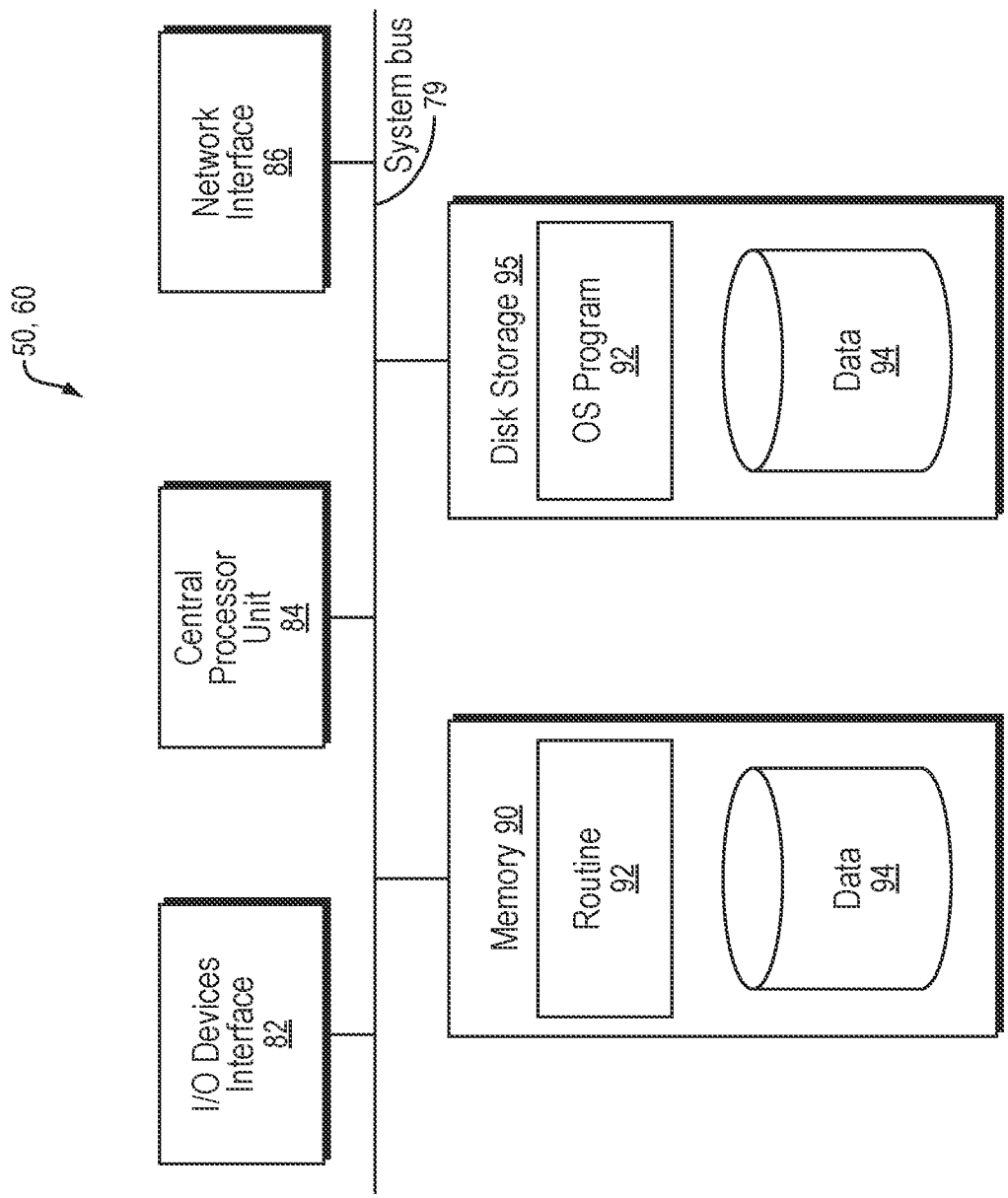
FIG. 10 is a diagram illustrating an example internal structure of a computer in the environment of FIG. 9.

FIG. 10 is a diagram of an example internal structure of a computer (e.g., client processor/device 50 or server computers 60) in the computer system of FIG. 9. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an input/output (I/O) device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 9). Memory 90 provides volatile storage for computer software instructions 92 and data 94 used to implement an embodiment of the present disclosure (e.g., the method 330, the system 400, the system 500, and the system 770, amongst others). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of assessing security vulnerability of an application, the method comprising:
running one or more static analysis tools on the application to generate a static vulnerability report;
running one or more dynamic analysis tools on the application to generate a dynamic vulnerability report;
decompiling code of the application to identify code of the application that accepts user input;
determining one or more vulnerabilities of the application using the identified code of the application that accepts user input;
generating a vulnerability report indicating the one or more vulnerabilities of the application determined using the identified code of the application that accepts user input; and
generating a final static vulnerability report and a final dynamic vulnerability report based on (i) the static vulnerability report, (ii) the dynamic vulnerability report, and (iii) the generated vulnerability report indicating the one or more vulnerabilities of the application determined using the identified code of the application that accepts user input, wherein the final static vulnerability report and the final dynamic vulnerability report enable remediating vulnerabilities of the application.

2. The method of claim 1 wherein the one or more static analysis tools is at least one of: a source component analysis (SCA) tool and a software application security test (SAST) tool.

3. The method of claim 1 wherein the one or more dynamic analysis tools is at least one of: a dynamic application security test (DAST) tool and an interactive application security test (IAST) tool.

4. The method of claim 1 wherein decompiling the code of the application comprises:
decompiling Java pages of the application.

5. The method of claim 1 wherein decompiling the code of the application comprises:
recursively decompiling the code to identify code of the application that accepts user input.

6. The method of claim 1 wherein the identified code of the application that accepts user input is at least one of: a Uniform Resource Locator (URL) and an application programming interface (API).

7. The method of claim 1 further comprising:
based on the decompiled code, determining input formatting accepted by the identified code of the application that accepts user input; and
determining the one or more vulnerabilities of the application using the determined input formatting.

8. The method of claim 1 wherein generating the final static vulnerability report and the final dynamic vulnerability report comprises:
removing at least one of duplicate vulnerabilities and false positive vulnerabilities from the static vulnerability report and the dynamic vulnerability report based on the generated vulnerability report indicating the one or more vulnerabilities of the application determined using the identified code of the application that accepts user input to create the final static vulnerability report and the final dynamic vulnerability report.

9. The method of claim 8 wherein removing at least one of duplicate vulnerabilities and false positive vulnerabilities from the static vulnerability report and the dynamic vulnerability report comprises:
normalizing vulnerability findings in the static vulnerability report and the dynamic vulnerability into standardized vulnerability findings; and
removing at least one of the duplicate vulnerabilities and the false positive vulnerabilities by comparing the static vulnerability report and the dynamic vulnerability with the standardized vulnerability findings to the generated vulnerability report indicating the one or more vulnerabilities of the application determined using the identified code of the application that accepts user input.

10. The method of claim 9 wherein normalizing the vulnerability findings comprises:
parsing the vulnerability findings in the static vulnerability report and the dynamic vulnerability to identify keywords in the vulnerability findings; and
reformatting the vulnerability findings in the static vulnerability report and the dynamic vulnerability report into the standardized vulnerability findings based on the identified keywords.

11. A system for assessing security vulnerability of an application, the system comprising:
a processor; and
a memory with computer code instructions stored thereon, the processor and the memory, with the computer code instructions, being configured to cause the system to:
run one or more static analysis tools on the application to generate a static vulnerability report;
run one or more dynamic analysis tools on the application to generate a dynamic vulnerability report;
decompile code of the application to identify code of the application that accepts user input;
determine one or more vulnerabilities of the application using the identified code of the application that accepts user input;
generate a vulnerability report indicating the one or more vulnerabilities of the application determined using the identified code of the application that accepts user input; and
generate a final static vulnerability report and a final dynamic vulnerability report based on (i) the static vulnerability report, (ii) the dynamic vulnerability report, and (iii) the generated vulnerability report indicating the one or more vulnerabilities of the application determined using the identified code of the application that accepts user input, wherein the final static vulnerability report and the final dynamic vulnerability report enable remediating vulnerabilities of the application.

12. The system of claim 11 wherein:
the one or more static analysis tools is at least one of: a source component analysis (SCA) tool and a software application security test (SAST) tool; and
the one or more dynamic analysis tools is at least one of: a dynamic application security test (DAST) tool and an interactive application security test (IAST) tool.

13. The system of claim 11 wherein, in decompiling the code of the application, the processor and the memory, with the computer code instructions, are configured to cause the system to:
decompile Java pages of the application.

14. The system of claim 11 wherein, in decompiling the code of the application, the processor and the memory, with the computer code instructions, are configured to cause the system to:
recursively decompile the code to identify code of the application that accepts user input.

15. The system of claim 11 wherein the identified code of the application that accepts user input is at least one of: a Uniform Resource Locator (URL) and an application programming interface (API).

16. The system of claim 11 wherein the processor and the memory, with the computer code instructions, are further configured to cause the system to:
based on the decompiled code, determine input formatting accepted by the identified code of the application that accepts user input; and
determine the one or more vulnerabilities of the application using the determined input formatting.

17. The system of claim 11 wherein, in generating the final static vulnerability report and the final dynamic vulnerability report, the processor and the memory, with the computer code instructions, are configured to cause the system to:
remove at least one of duplicate vulnerabilities and false positive vulnerabilities from the static vulnerability report and the dynamic vulnerability report based on the generated vulnerability report indicating the one or more vulnerabilities of the application determined using the identified code of the application that accepts user input to create the final static vulnerability report and the final dynamic vulnerability report.

18. The system of claim 17 wherein, in removing at least one of duplicate vulnerabilities and false positive vulnerabilities from the static vulnerability report and the dynamic vulnerability report, the processor and the memory, with the computer code instructions, are configured to cause the system to:
normalize vulnerability findings in the static vulnerability report and the dynamic vulnerability into standardized vulnerability findings; and
remove at least one of the duplicate vulnerabilities and the false positive vulnerabilities by comparing the static vulnerability report and the dynamic vulnerability with the standardized vulnerability findings to the generated vulnerability report indicating the one or more vulnerabilities of the application determined using the identified code of the application that accepts user input.

19. The system of claim 18 wherein, in normalizing the vulnerability findings, the processor and the memory, with the computer code instructions, are configured to cause the system to:
    parse the vulnerability findings in the static vulnerability report and the dynamic vulnerability to identify keywords in the vulnerability findings; and
    reformat the vulnerability findings in the static vulnerability report and the dynamic vulnerability report into the standardized vulnerability findings based on the identified keywords.

20. A computer program product for assessing security vulnerability of an application, the computer program product comprising:
    one or more non-transitory computer-readable storage devices and program instructions stored on at least one of the one or more storage devices, the program instructions, when loaded and executed by a processor, cause an apparatus associated with the processor to:
        run one or more static analysis tools on the application to generate a static vulnerability report;
        run one or more dynamic analysis tools on the application to generate a dynamic vulnerability report;
        decompile code of the application to identify code of the application that accepts user input;
        determine one or more vulnerabilities of the application using the identified code of the application that accepts user input;
        generate a vulnerability report indicating the one or more vulnerabilities of the application determined using the identified code of the application that accepts user input; and
        generate a final static vulnerability report and a final dynamic vulnerability report based on (i) the static vulnerability report, (ii) the dynamic vulnerability report, and (iii) the generated vulnerability report indicating the one or more vulnerabilities of the application determined using the identified code of the application that accepts user input, wherein the final static vulnerability report and the final dynamic vulnerability report enable remediating vulnerabilities of the application.

\* \* \* \* \*